US012695625B2

(12) United States Patent
Clark et al.

(10) Patent No.: US 12,695,625 B2
(45) Date of Patent: Jul. 28, 2026

(54) COMPUTER IMPLEMENTED METHOD AND SYSTEM FOR THE PROVISION OF ACCESS TO A PLURALITY OF FUNCTIONS AND APPLICATIONS ASSOCIATED WITH A BLOCKCHAIN

(71) Applicant: nChain Licensing AG, Zug (CH)

(72) Inventors: Paul Clark, London (GB); Ricky Charles Rand, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/718,778

(22) PCT Filed: Feb. 20, 2023

(86) PCT No.: PCT/EP2023/054242
§ 371 (c)(1),
(2) Date: Jun. 11, 2024

(87) PCT Pub. No.: WO2023/156667
PCT Pub. Date: Aug. 24, 2023

(65) Prior Publication Data
US 2025/0055700 A1 Feb. 13, 2025

(30) Foreign Application Priority Data

Feb. 21, 2022 (GB) ...................................... 2202332
Feb. 21, 2022 (GB) ...................................... 2202333
Feb. 21, 2022 (GB) ...................................... 2202334

(51) Int. Cl.
*H04L 9/32* (2006.01)
*H04L 9/00* (2022.01)
(52) U.S. Cl.
CPC .......... *H04L 9/3252* (2013.01); *H04L 9/3213* (2013.01); *H04L 9/3239* (2013.01);
(Continued)

(58) Field of Classification Search
None
See application file for complete search history.

(56) References Cited

U.S. PATENT DOCUMENTS

| | | |
|---|---|---|
| 10,785,035 B1 | 9/2020 | Lv |
| 11,645,650 B1 | 5/2023 | Singh |

(Continued)

FOREIGN PATENT DOCUMENTS

| | | | |
|---|---|---|---|
| CN | 111768198 A | * 10/2020 | ......... G06Q 20/3829 |
| CN | 112732695 A | 4/2021 | |

(Continued)

OTHER PUBLICATIONS

PCT/EP2023/054242 International Search Report and Written Opinion dated May 12, 2023, 12 pages.
(Continued)

*Primary Examiner* — Nelson S. Giddins
(74) *Attorney, Agent, or Firm* — Galvani Smith PLLC

(57) ABSTRACT

A computer-implemented method and system is provided which enables interaction between a device and an asset transfer platform. The method may be implemented by a processing resource through the cloud or through a collection of localised hardware or software resources. A message is received from a client device associated with a user. The message may comprise at least one identifier of a message type associated with the message. This may be implemented using a parameter in an API call. This may also be implemented using a parameter in a message transmitted using a data communications network. The message may also comprise at least one identifier associated with a profile registered on the asset transfer processing platform, wherein the profile relates to at least one event stream provided by the asset transfer processing platform, wherein the at least one event stream is associated with at least one asset type.

18 Claims, 17 Drawing Sheets

(52) U.S. Cl.
CPC .......... *H04L 9/3247* (2013.01); *H04L 9/3271* (2013.01); *H04L 9/3297* (2013.01); *H04L 9/50* (2022.05)

(56) References Cited

U.S. PATENT DOCUMENTS

| | | | |
|---|---|---|---|
| 2012/0084392 | A1 | 4/2012 | Lipfert |
| 2019/0034465 | A1 | 1/2019 | Shimamura et al. |
| 2019/0102761 | A1* | 4/2019 | Pandian .................. H04L 69/08 |
| 2019/0103973 | A1 | 4/2019 | Chalkias et al. |
| 2019/0140822 | A1* | 5/2019 | Xie ...................... G06Q 20/382 |
| 2019/0238550 | A1* | 8/2019 | Zhang .................. H04L 63/105 |
| 2019/0278766 | A1 | 9/2019 | Xia |
| 2020/0293646 | A1 | 9/2020 | Rooyakkers |
| 2020/0394183 | A1 | 12/2020 | Jois |
| 2021/0089514 | A1 | 3/2021 | Werner et al. |
| 2021/0217001 | A1 | 7/2021 | Harrison |
| 2021/0232596 | A1 | 7/2021 | Qi et al. |
| 2021/0357369 | A1 | 11/2021 | Kwon et al. |
| 2022/0100777 | A1 | 3/2022 | Jing |
| 2022/0271960 | A1 | 8/2022 | Liu |
| 2023/0031316 | A1 | 2/2023 | Cook et al. |
| 2023/0224166 | A1 | 7/2023 | Rector |

FOREIGN PATENT DOCUMENTS

| | | |
|---|---|---|
| CN | 112905616 A | 6/2021 |
| WO | 2021165814 A2 | 8/2021 |
| WO | 2021165816 A1 | 8/2021 |
| WO | 2021165817 A1 | 8/2021 |
| WO | 2021165848 A1 | 8/2021 |
| WO | 2022268995 A2 | 12/2022 |

OTHER PUBLICATIONS

PCT/EP2023/054245 International Search Report and Written Opinion dated May 31, 2023, 14 pages.
PCT/EP2023/054246 International Search Report and Written Opinion dated May 23, 2023, 10 pages.

* cited by examiner

S1100 – receive request for processing of a transaction.

S1102 – cryptographic signature identified.

S1104 – payment data store accessed

S1106 – transaction rejected.

S1108 – transaction can proceed.

COMPUTER IMPLEMENTED METHOD AND SYSTEM FOR THE PROVISION OF ACCESS TO A PLURALITY OF FUNCTIONS AND APPLICATIONS ASSOCIATED WITH A BLOCKCHAIN

CROSS REFERENCE TO RELATED APPLICATIONS

This application is the U.S. National Stage of International Application No. PCT/EP2023/054242 filed on Feb. 20, 2023, which claims the benefit of United Kingdom Patent Application No. 2202332.9, filed on Feb. 21, 2022, United Kingdom Patent Application No. 2202333.7, filed on Feb. 21, 2022, and United Kingdom Patent Application No. 2202334.5, filed on Feb. 21, 2022, the contents of which are incorporated herein by reference in their entireties.

TECHNICAL FIELD

This disclosure relates generally to methods and systems for implementing a platform of one or more services associated with a distributed ledger, i.e. a blockchain, for one or more clients. Particularly, the present disclosure relates, but is not limited to, the provision of access to a plurality of functions and applications associated with a blockchain for one or more clients, such as the enabling the transfer of digital or tokenised assets.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers, public and private blockchains, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain, and alternative blockchain implementations and protocols associated with any kind of digital asset or a representation of a digital asset fall within the scope of the present disclosure. The terms "client", "entity", "node", "user", "sender", "recipient", "payer", "payee" may refer herein to a computing or processor-based resource. The term "Bitcoin" is used herein to include any version or variation that derives from or is based on the Bitcoin protocol. The term "digital asset" may refer to any transferrable asset, such as cryptocurrency, tokens representing at least a part of a property, a smart contract, a license, i.e. software license, or DRM contracts for media content, etc. It will be understood that the term "digital asset" is used throughout this document to represent a commodity that may be associated with a value, which may be transferred to or provided as a payment in a transaction from one entity to another.

A blockchain is a peer-to-peer, electronic ledger, which is implemented as a computer-based, decentralised, distributed system made up of blocks, which in turn are made up of transactions. Each transaction is a data structure that encodes the transfer of control of a digital asset between participants in the blockchain system and includes at least one input and at least one output. Each block contains a hash of the previous block so that blocks become chained together to create a permanent, unalterable record of all transactions which have been written to the blockchain since its inception. Transactions contain small programs known as scripts, embedded into their inputs and outputs, which specify how and by whom the outputs of the transactions can be accessed. On the Bitcoin platform, these scripts are written using a stack-based scripting language.

In order for a transaction to be written to the blockchain it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid, and the transaction is then written to the blockchain. Thus, in order for a transaction to be written to the blockchain, it must be i) validated by the first node that receives the transaction-if the transaction is validated, the node relays it to the other nodes in the network; ii) added to a new block built by a miner; and iii) mined, i.e. added to the public ledger of past transactions.

It will be appreciated that the nature of the work performed by miners will depend on the type of consensus mechanism used to maintain the blockchain. While proof of work (PoW) is associated with the original Bitcoin protocol, it will be appreciated that other consensus mechanisms, such as, proof of stake (POS), delegated proof of stake (DPOS), proof of capacity (PoC), proof of elapsed time (PoET), proof of authority (PoA) etc. may be used. Different consensus mechanisms vary in how mining is distributed between nodes, with the odds of successfully mining a block depending on e.g. a miner's hashing power (PoW), an amount of cryptocurrency held by a miner (POS), an amount of cryptocurrency staked on a delegate miner (DPoS), a miner's ability to store pre-determined solutions to a cryptographic puzzle (PoC), a wait time randomly assigned to a miner (PoET), etc. Typically, miners are provided with an incentive or reward for mining a block. The Bitcoin blockchain, for example, rewards miners with newly issued cryptocurrency (Bitcoin) and fees associated with transactions in the block (transaction fees). For the Bitcoin blockchain, the amount of cryptocurrency issued diminishes with time, with the incentive eventually consisting of transaction fees only. It will be appreciated, therefore, that the handling of transaction fees is a part of the underlying mechanism for committing data to public blockchains such as the Bitcoin blockchain.

As mentioned previously, each transaction in a given block encodes the transfer of control of a digital asset between participants in the blockchain system. The digital asset need not necessarily correspond to a cryptocurrency. For example, the digital asset may pertain to a digital representation of a document, image, physical object, etc. The payment of cryptocurrency and/or transaction fees to miners may simply act as an incentive to maintain the validity of the blockchain by performing the necessary work. It may be that the cryptocurrency associated with the blockchain acts as a security for miners, with the blockchain itself being a ledger for transactions that predominantly relate to digital assets other than cryptocurrency. In some cases, it may be that the transfer of cryptocurrency between participants is handled by an entity that is different from and/or independent of the entity using the blockchain to maintain a ledger of transactions.

Once stored in the blockchain as a UTXO, a user can transfer control of the associated resource to another address associated with an input in another transaction. This transfer is usually, but not essentially, done using a digital wallet. This digital wallet may be a device; physical medium; program; application (app) on a computing device such as a desktop, laptop or a mobile terminal; or a remotely-hosted service, associated with a domain on a network, such as the Internet. The digital wallet stores public and private keys and can be used to track ownership of resources; tokens and assets etc., that are associated with a user; receive or spend digital assets; transfer tokens which may relate to digital assets, such as cryptocurrencies, licences, property, or other types of resource.

Although blockchain technology is most widely known for the use of cryptocurrency implementation, digital entrepreneurs are exploring the use of both the cryptographic security system Bitcoin is based on, and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper-proof records of events, distributed processing etc.) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine-executable program, which comprises rules that can process inputs in order to produce results, which can then cause actions to be performed dependent upon those results.

Specifically, one area of research is into the transfer of assets and how it can be recorded on the blockchain to ensure the transfer benefits from the immutability of the blockchain. Further, it is of specific interest to provide an efficient and secure protocol for the transfer of assets in addition to a means of logging such a transfer to ensure that it is securely recorded and logged with the support of the underlying blockchain infrastructure.

SUMMARY

Throughout this specification the word "comprise", or variations such as "includes", "comprises", or "comprising", will be understood to imply the inclusion of a stated element, integer, step, or group of elements, integers, or steps, but not the exclusion of any other element, integer, step, or group of elements, integers, or steps.

In some embodiments, there is provided a computer-implemented method of providing access to an asset transfer processing platform. The asset transfer processing platform may be a resource which processes payments in accordance with a payment processing protocol. The asset transfer processing platform may be implemented using any processing resource. The method may be implemented by a processing resource which may be implemented through the cloud or through a collection of localised hardware or software resources. The method may comprise receiving a message from a client device associated with a user. The message may be received through a data communications network or another suitable means, such as by an application programming interface (API) call. The client device may be any computing device. The message may comprise at least one identifier of a message type associated with the message. This may be implemented using a parameter in an API call. This may also be implemented using a parameter in a message transmitted using a data communications network.

The message may also comprise at least one identifier associated with a profile registered on the asset transfer processing platform, wherein the profile relates to at least one event stream provided by the asset transfer processing platform, wherein the at least one event stream is associated with at least one asset type.

An event stream may comprise a blockchain-supported append-only log wherein data recorded in a blockchain transaction is added to a log which is ordered in time. That is to say, an event stream logs data that is for recordal on the blockchain in time order, i.e. as they occur in a sequence of blockchain transaction. An event stream can be implemented using any suitable data structure. An event stream may comprise a series of entries which are stored in a sequence wherein each entry in the sequence is referenced in the sequence by a monotonically increasing number. That is to say, the first entry in an event stream is entry 1, the second entry is entry 2 and so on. The utilisation of blockchain transactions for writing data into an event stream means that it can be guaranteed that individual entries in the event stream have not be modified since they were written, no entries have been inserted between previously contiguous entries, no entries have been removed and no entries have been re-ordered. It is also not possible for unauthorised parties to append events to an event stream.

The message may also comprise request data related to a request associated with the message and the profile. The request data may comprise instruction data related to the request. The instruction data may identify parties and/or permit data structures to be used to process the request.

A profile may correspond to an allocation of asset transfer platform resources which are used in the processing of an asset transfer using the asset transfer platform. An instance of an asset transfer platform associated with a profile may utilise the allocated resources to carry out processing steps as part of the method.

The method may further comprise determining, from the received message, the message type associated with the message and the profile registered on the asset transfer processing platform. Determining the message type may comprise processing the request to determine the presence of a parameter in an API call or the presence of a parameter in a message transmitted over a data communications network.

The method may further comprise identifying, based on the determined message type, a message response protocol for the determined message type. The message response protocol defines a series of criteria for determining the response type or content of the response to be provided to the requestor. The message response protocol may define the requirements of a request in order for a request to be actioned. The message response protocol may require accessing a permit data structure to determine the presence of data items or cryptographic signatures.

The method may further comprise identifying a permit data structure for the profile, wherein the permit data structure provides at least a criterion defining which users can interact with the profile using the determined message type. A permit data structure may comprise a public key, a cryptographic signature generated using the private key corresponding to the public key, at least one data item and a permit identifier. The private key and the public key may be cryptographically paired. The private key and the public key may be generated using elliptic curve digital signature algorithm (ECDSA) techniques. The data item may be an alphanumeric sequence or a numerical sequence.

The method may further comprise processing the request data to determine the presence of a cryptographic signature used to sign the request data and, based on the determination of the presence of a cryptographic signature used to sign the request data, further processing the request data to extract data items from the request data.

The method may further comprise applying the identified message response protocol to the extracted data items. The application may comprise using the data items in the request data to determine whether an action could be taken in response to the request. The data item may comprise the identification of parties, the identification of permit data structures, the identification of account holders and/or account managers and the identity of asset types.

An account holder may correspond to a user associated with the profile registered on the asset transfer platform. An account holder may correspond to an account which may be a funding account containing a supply of currency to be used in transactions using the asset transfer platform. The account may alternatively or additionally correspond to an asset register where a supply of an asset of a specific asset type may be registered. Such an account may be a gold account. An account manager may correspond to a bank who manages the funding account or an asset registry which is used to administer the asset register. In the example of a gold account, the account manager may, for example, be the Royal Mint at Llantrisant, United Kingdom, CF72 8YT and the asset registry would be the account a person has with the Royal Mint. Another example may be a funding account held at HSBC Bank where the account manager would be HSBC Bank and the asset registry would be the funding account for their GBP (i.e. Great British Pound) savings The method may further comprise generating a response to the message based on the message response protocol, the extracted data items and the permit data structure by determining, using the permit data structure, whether the user is permitted to interact with the profile using the identified message type.

The method may further comprise determining, using the message response protocol, whether the extracted data items meet the requirements of the determined message type and based on the requirements of the determined message type being met, generating response content by interacting with the at least one event stream associated with the profile.

In other embodiments, there is provided a computer-implemented method of enabling a user to update a balance associated with an asset transfer processing platform. The asset transfer processing platform may be a resource which processes payments in accordance with a payment processing protocol. The asset transfer processing platform may be implemented using any processing resource. The method may be implemented by a processing resource which may be implemented using software or hardware or using a cloud-based resource.

The method may further comprise receiving a message from a client device associated with a user.

The message may further comprise at least one of an identifier associated with a balance update, at least one identifier associated with a profile registered on the asset transfer processing platform.

The method may further comprise determining, from the received message, the at least one profile identified in the message. A profile may correspond to an instance of the asset transfer platform.

The method may further comprise applying an update request protocol to the extracted data items to determine whether the balance can be updated. The update request protocol may comprise a series of criteria which are used to determine whether a balance can be updated, i.e. whether a transfer from the account can take place. A transfer from the account may be transferring part of the asset to another party.

The method may further comprise generating a response to the message based on the update request protocol, the extracted data items and the permissions data structure by determining, using the permissions data structure, whether the user has the required cryptographic rights to update the balance, determining, using the update request protocol, whether the update can be made; and based on the concurrence with the requirements of the determined message type, generating response content by updating the balance and interacting with the at least one event stream associated with the profile.

An interaction with the event stream may comprise at least one of viewing the event stream, retrieving data from the event stream, writing to the event stream, reading from the event stream or appending data to the event stream. Any interaction with the event stream may generate its own response content. The response content may be a message to an entity requesting interaction with the event stream or a message to an entity associated with the event stream.

In some embodiments, there is provided a computer-implemented method of enabling access to the asset transfer processing platform. The method may be implemented by a processing resource. The method may comprise initialising an application on the computing device, the application configured to generate a message. The message may comprise at least one of at least one identifier of a message type associated with the message, at least one identifier associated with a profile registered on the asset transfer processing platform, wherein the profile is associated with at least one event stream implemented by the asset transfer processing platform, wherein the at least one event stream is associated with at least one asset type, request data related to a request associated with the message and the profile;

The method may further comprise receiving input from a user identifying a message type for a message to be sent to the asset transfer processing platform. The input may further identify a profile registered on the asset transfer processing platform. The input may further comprise request data comprising the content of a request to be made to an asset transfer processing platform.

The method may further comprise applying a cryptographic signature to the request data to generate signed request data.

The method may further comprise generating a message comprising an identifier of the message type identified by the user, an identifier of the profile registered on the asset transfer processing platform, and the signed request data.

The method may further comprise sending the message to the asset transfer processing platform.

In other embodiments, there is provided an asset transfer processing platform. The platform may be configured to receive a message from a client device associated with a user, the message comprising:
    at least one identifier of a message type associated with the message;
    at least one identifier associated with a profile registered on the asset transfer processing platform, wherein the profile is associated with at least one event stream associated with the asset transfer processing platform, wherein the at least one event stream is associated with at least one asset type; and
    request data related to a request associated with the message and the profile.

The platform may be configured to determine, from the received message, the message type associated with the message and the profile registered on the asset transfer processing platform.

The platform may be further configured to identify, based on the determined message type, a message response protocol for the determined message type.

The platform may be further configured to identify a permit data structure for the profile, wherein the permit data structure provides a criterion defining which users can interact with the profile using the determined message type.

Interaction with the profile may comprise any interaction with the event stream associated with the profile.

The platform may be configured to process the request data to determine the presence of a cryptographic signature used to sign the request data and, based on the determination of the presence of a cryptographic signature used to sign the request data, further process the request data to extract data items from the request data to be used in the determination of a response using the identified message response protocol.

The platform may be configured to apply the identified message response protocol to the extracted data items.

The platform may be further configured to generate a response to the message based on the message response protocol, the extracted data items and the permissions data structure by determining, using the permit data structure, whether the user has the required cryptographic rights to interact with the profile using the identified message type, determine, using the message response protocol, whether the extracted data items meet the requirements of the determined message type, and based on the requirements of the determined message type, generating response content by interacting with the at least one event stream associated with the profile.

In some embodiments, there is provided a computer-implemented method of validating at least one data item. The data item may be provided during an asset transfer event. The data item may be an alphanumeric sequence of characters. The data item may be a number. The data item may be a randomly generated or pseudorandomly generated string. The method implemented by a processing resource. The processing resource may be a software-based or hardware-based resource. The method may comprise receiving request data from a computing device. The computing device may be a mobile computing device. The request data may comprise an instruction data set comprising an identifier for an entity associated with the asset transfer event. The request data may further comprise a challenge data structure. The challenge data structure may comprise a first numerical identifier for the at least one data item; and/or a representation of the at least one data item.

The method may comprise determining the validity of the at least one data item by:
    determining concurrence between the representation of the at least one data item and a stored data item in a permit data structure associated with the entity by either determining the presence of a corresponding credential in the instruction data set or in the permit data structure. A corresponding credential may be the same data item or it may be another data item which is equivalent to the data item. For example, the corresponding credential may be a hash of the data item.

The method may comprise generating a second numerical identifier for the corresponding credential in the respective instruction data set or permit data structure.

The method may comprise generating response data comprising an identifier for the corresponding credential and/or the second numerical identifier and/or a signature associated with the first numerical identifier and the second numerical identifier.

The method may further comprise sending the response data to the computing device.

In other embodiments, there is provided a computer-implemented method of validating at least one data item. The data item may be provided during an asset transfer event. The data item may be an alphanumeric sequence of characters. The data item may be a number. The data item may be a randomly generated or pseudorandomly generated string. The method implemented by a first processing resource. The first processing resource may be a payment processing resource or an instance of a payment processing resource. The method may comprise generating request data. The request data may comprise an instruction data set comprising an identifier for an entity associated with the asset transfer event and/or a challenge data structure, where the challenge data structure may comprise a first numerical identifier for the at least one data item; and/or a representation of the at least one data item.

The method may further comprising sending the request data to a second processing resource. The second processing resource may be any computing device. The second processing resource may be an instance of a payment processing resource.

The method may further comprise receiving response data from the second processing resource.

The method may further comprise validating the data item by determining from the response data the presence of a signature of a combination of a second numerical identifier combined with the first numerical identifier.

In some embodiments, there is provided a computer-implemented method of appending entries to at least one event stream. An event stream may comprise a blockchain-supported append-only log wherein data recorded in a blockchain transaction is added to a log which is ordered in time. That is to say, an event stream logs data recorded on the blockchain in time order, i.e. as they appear on the blockchain. An event stream can be implemented using any suitable data structure. An event stream may comprise a series of entries which are stored in a sequence wherein each entry in the sequence is referenced in the sequence by a monotonically increasing number. That is to say, the first entry in an event stream is entry 1, the second entry is entry 2 and so on. The utilisation of an underlying blockchain means that it can be guaranteed that individual entries in the event stream have not be modified since they were written, no entries have been inserted between previously contiguous entries, no entries have been removed and no entries have been re-ordered. It is also not possible for unauthorised parties to append events to an event stream. The at least one event stream may pertain to an asset account associated with a user registered on an asset transfer platform. The method may be implemented on a processing resource. The processing resource may be hardware or software implemented.

The method may comprise receiving a request to append an entry to the at least one event stream, the entry comprising instruction data and an identifier for the at least one event stream. The instruction data may relate to a transaction being processed by the processing resource or by a further resource in communication with the processing resource. The request may be received via a data communications network or via an application programming interface (API) call. The method may further comprise retrieving the identifier for the at least one event stream from the request. The identifier may identify an instance of a payment processing resource associated with the at least one event stream. Based on the identifier, the method may further comprise accessing the at least one event stream and obtaining a log of previous entries associated with the identified at least one event stream. The log of previous entries may be pruned. The pruning may remove entries which are older than a specified expiry date. The method may further comprise retrieving the instruction data from the request. The instruction data may comprise a plurality of data items which may be processed further by the processing resource.

The method may comprise generating a unique identifier for the instruction data. The generation of the unique identifier may comprise retrieving the unique identifier from the instruction data. Such a unique identifier may be a cryptographic signature used to sign the instruction data. The generation of the unique identifier may comprise processing the instruction data to generate the identifier using, say, for example, a hashing algorithm. Based on the generated unique identifier, the method may further comprise determining whether data identical to the instruction data is present in the log of previous entries associated with the identified event stream. This may comprise searching through the log for the generated unique identifier to determine its presence or lack thereof in the log of previous entries. The log of previous entries may be a database of transactions which have been recorded on the event stream.

Based on the outcome of the determining step, the method may further comprise either appending an entry to the at least one event stream, the entry comprising the unique identifier for the instruction data; or rejecting the entry to the event stream as a duplicated entry.

Embodiments may be combined either in full or in part.

BRIEF DESCRIPTION OF THE DRAWINGS

Aspects and embodiments of the present disclosure will now be described, by way of example only, and with reference to the accompany drawings, in which.

DETAILED DESCRIPTION

Figure 1A:
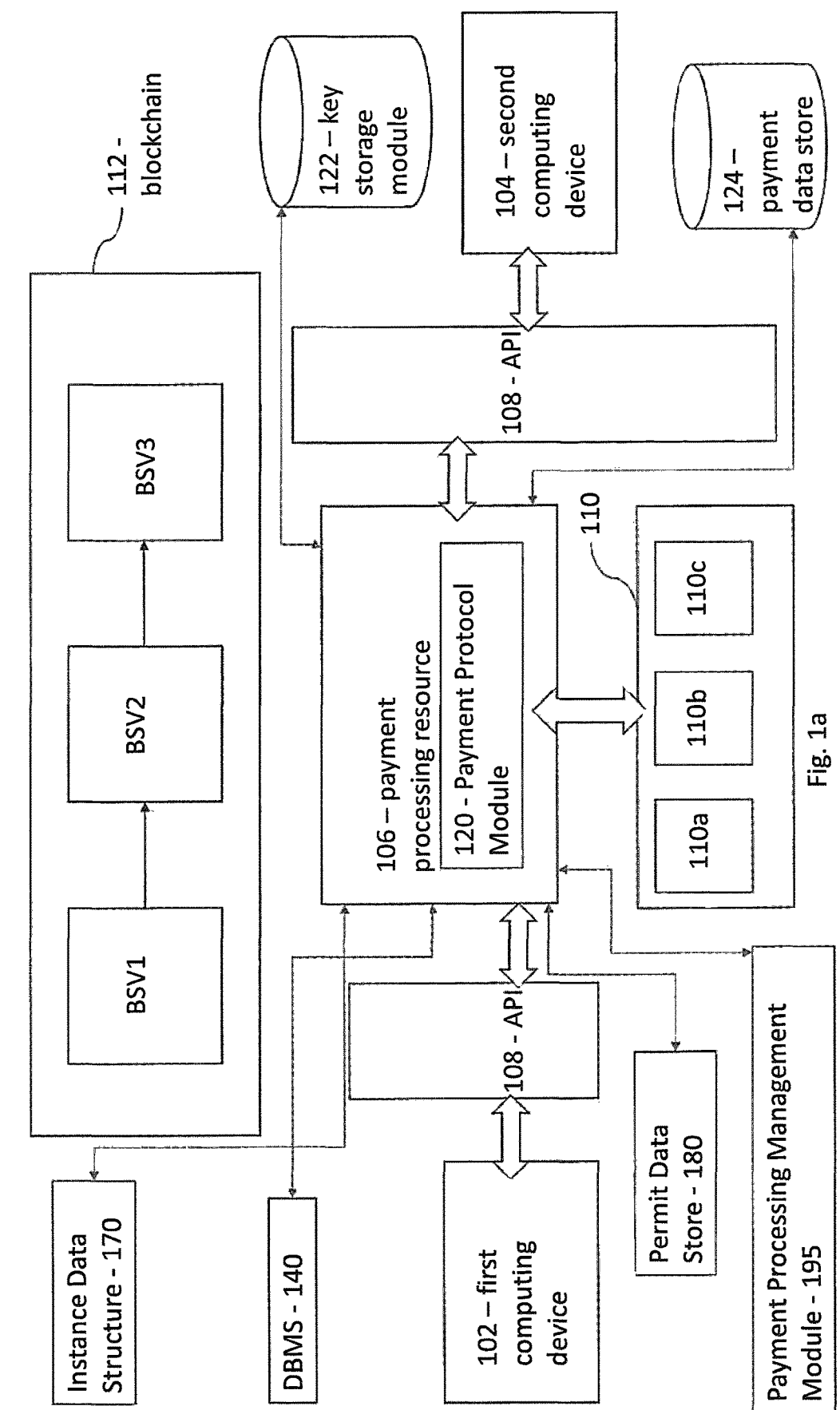
FIG. 1a illustrates a system in accordance with an embodiment.

We now provide a detailed discussion of aspects and embodiments of the present disclosure to provide the reader with a full and complete understanding of the present disclosure.

Viewed from a first aspect, there is provided a computer-implemented method of providing access to an asset transfer processing platform. The method may be implemented by a processing resource. The method may comprise receiving a message from a client device associated with a user. The message may comprise at least one identifier of a message type associated with the message. The message may further comprise at least one identifier associated with a profile registered on the asset transfer processing platform, wherein the profile relates to at least one event stream provided by the asset transfer processing platform, wherein the at least one event stream is associated with at least one asset type. The message may further comprise request data related to a request associated with the message and the profile. The method may further comprise determining, from the received message, the message type associated with the message and the profile registered on the asset transfer processing platform. The method may further comprise identifying, based on the determined message type, a message response protocol for the determined message type. The method may further comprise identifying a permit data structure for the profile, wherein the permit data structure provides at least a criterion defining which users can interact with the profile using the determined message type. The method may further comprise processing the request data to determine the presence of a cryptographic signature used to sign the request data and, based on the determination of the presence of a cryptographic signature used to sign the request data, further processing the request data to extract data items from the request data. The method may further comprise applying the identified message response protocol to the extracted data items. The method may further comprise generating a response to the message based on the message response protocol, the extracted data items and the permit data structure by determining, using the permit data structure, whether the user is permitted to interact with the profile using the identified message type, determining, using the message response protocol, whether the extracted data items meet the requirements of the determined message type, and based on the requirements of the determined message type being met, generating response content by interacting with the at least one event stream associated with the profile.

A method in accordance with the first aspect provides a method by which a user can interact with an asset transfer platform. The interaction is determined by the permissions provided by a permit data structure which provides cryptographic security for the interaction. This means that some interactions can be allowed by the permit where some interactions may not.

The method may further comprise providing the response content to the client device. The response content may be determined based on an entry from the event stream. The response content may comprise data which is recorded on the event stream. The data may be combined with an alphanumeric phrase. The response content may be a rejection of the message and the rejection is provided because the request data is not cryptographically signed and/or the rejection may be provided if the message type identifier does not correspond to a message type and/or the rejection is provided if a profile registered on the asset transfer processing platform cannot be determined.

The method enables content to be retrieved from an event stream and provided to a client. This is based on what is enabled by the cryptographic security provided by the permit data structure.

The permit data structure may comprise data identifying at least one of an asset type associated with the profile, an asset manager identifier, permissions provided to the asset manager by the profile, permissions provided to the user associated with the profile.

The message response protocol may determine an operation to be applied to the event stream. This operation may be a write or read operation.

The effect of this is that only specific operations on the event stream are permitted and they are determined by the message response protocol and the criterion it sets regarding the content of the permit data structure.

The identified message type may correspond to a retrieval request, further wherein the message response protocol is a retrieval request protocol, wherein applying the retrieval request protocol may comprise determining whether the client device is authorised to access the profile by determining whether a session permit has been issued to the client device wherein, if the client device has been issued with a session permit, the processing resource retrieves a current state from the event stream corresponding to the identified profile and provides the balance as part of the response provided to the client device; and further wherein, if the client device has not been issued with a session permit, the processing resource generates a rejection message and provides the rejection message to the client device.

That is to say, the method may enable a client to retrieve data from an event stream provided a session permit can be provided. A session permit can be provided which is valid only for a specified time period. A session permit can also be revoked by a holder of a permit data structure.

The identified message type corresponds to an update request requesting an update to at least one account associated with an asset type, further wherein the message response protocol is an update request protocol, wherein applying the update request protocol comprises determining whether the update is a duplicate based on the data items extracted from the request data by determining the presence of corresponding instruction data on a log of events previously appended to the event stream and further wherein, if the update is a duplicated update, generating a response message to be provided to the client device indicating the update is a duplicate and further wherein, if the update is not a duplicate, applying an update processing protocol to the request data for determining the validity of the update; and, if the update is valid, appending the update to the event stream; and, if the update is not valid, generating a rejection message for the client device.

That is to say, the method may enable a client to update a balance subject to what is enabled by the permit data structure, provided the update request has not previously been made.

The generation of the update request may comprise generating a blockchain transaction for synchronising event streams corresponding to entities identified in the request data wherein the blockchain transaction comprises, for each of the entities identified in the request data, a dust input spending a dust output associated with a previous transaction and a respective unspent transaction output corresponding to the dust input, and an unspent transaction output associated with the request updating event streams corresponding to the entities identified in the request data.

The identified message type may correspond to a settings request requesting a change to at least one field in the profile associated with the asset transfer processing platform and wherein the message response protocol is a settings request protocol, wherein applying the settings request protocol comprises extracting from the data items at least one identifier respectively identifying a profile setting to be modified, determining from the permit data structure whether the user is permitted to make the modification, based on the permit data structure, modifying the at least one setting.

That is to say, the method may allow the settings of a profile to be changed based on the permit data structure.

The data items may comprise a timestamp identifying the time at which the message was generated; and the processing resource may be configured to admit the request if the timestamp indicates that the message was generated within a determined period of time from the current time; and rejects the request if the timestamp indicates the time at which the message was generated was outside of the determined period.

Viewed from a second aspect, there is provided a computer-implemented method of enabling a user to update a balance associated with an asset transfer processing platform. The method may be implemented by a processing resource. The method may comprise: receiving a message from a client device associated with a user. The message may comprise an identifier associated with a balance update, at least one identifier associated with a profile registered on the asset transfer processing platform, wherein the profile is associated with at least one event stream provided by the asset transfer processing platform, wherein the at least one event stream is associated with at least one asset type; and request data related to the update of the balance. The method may further comprise determining, from the received message, the at least one profile identified in the message. The profile may be an allocation of resources of the processing resource and may be an instance of the processing resource. The instance may be implemented through the cloud or through hardware or software. The method may further comprise identifying a permit data structure, wherein the permit data structure provides a criterion defining which users can update the balance. The permit data structure may associate a cryptographic signature with a data item. The data item may be an alphanumeric sequence or a numerical sequence. The data item may be randomly, deterministically or pseudorandomly generated.

A method in accordance with the second aspect provides a secure way in which an asset transfer platform can process a request to update a balance. The method utilises permit data structures to provide cryptographic support to prevent users updating the balance who do not have the right to do so.

The method may further comprise processing the request data to determine the presence of a cryptographic signature used to sign the request data and, based on the determination of the presence of a cryptographic signature used to sign the request data, further process the request data to extract data items from the request data to be used in the update of the balance. The method may further comprise applying an update request protocol to the extracted data items to determine whether the balance can be updated. The update of the balance may be due to a transaction based on instruction data provided by the client. The instruction data may be signed by a cryptographic signature which is validated based on a permit data structure.

The method may further comprise generating a response to the message based on the update request protocol, the extracted data items and the permissions data structure. This may be by determining, using the permissions data structure, whether the user has the required cryptographic rights to update the balance, determining, using the update request protocol, whether the update can be made; and based on the concurrence with the requirements of the determined message type, generating response content by updating the balance and interacting with the at least one event stream associated with the profile.

Viewed from a third aspect, there is provided a computer-implemented method of enabling a user to use a computing device to access an asset transfer processing platform. The user may use an identifier to access the asset transfer processing platform. The asset transfer processing platform may be a payment processing resource. The asset transfer processing platform may be implemented in software or hardware. The access to the asset transfer processing platform may be via data communications network or by another suitable method, such as by an API call which utilises an identifier for the user and a parameter to identify what the required interaction will be. The method may be implemented by a processing resource. The processing resource may be software or hardware implemented. The processing resource may be cloud implemented or distributed over a plurality of processors. The method may comprise initialising an application on the computing device, the application may be configured to generate a message comprising at least one identifier of a message type associated with the message, at least one identifier associated with a profile registered on the asset transfer processing platform, wherein the profile is associated with at least one event stream implemented by the asset transfer processing platform, wherein the at least one event stream is associated with at least one asset type, and request data related to a request associated with the message and the profile. The method may comprise receiving input from a user identifying a message type for a message to be sent to the asset transfer processing platform, a profile registered on the asset transfer processing platform, request data comprising the content of a request to be made to an asset transfer processing platform The method may further comprise applying a cryptographic signature to the request data to generate signed request data. The method may further comprise generating a message comprising an identifier of the message type identified by the user, an identifier of the profile registered on the asset transfer processing platform; and the signed request data. The method may further comprise sending the message to the asset transfer processing platform.

A method in accordance with the third aspect provides a method by which the user can transmit a message to the asset transfer platform. The application enables the user to provide instruction data which is then signed so that it can be used, in combination with a permit data structure, to securely enable the user to interact with the asset transfer platform.

Viewed from a fourth aspect, there is provided an asset transfer processing platform configured to receive a message from a client device associated with a user, the message comprising at least one identifier of a message type associated with the message, at least one identifier associated with a profile registered on the asset transfer processing platform, wherein the profile is associated with at least one event stream implemented by the asset transfer processing platform, wherein the at least one event stream is associated with at least one asset type; and request data related to a request associated with the message and the profile. The asset transfer processing platform may be configured to determine, from the received message, the message type associated with the message and the profile registered on the asset transfer processing platform. The asset transfer processing platform may be further configured to identify, based on the determined message type, a message response protocol for the determined message type. The asset transfer processing platform may be configured to identify a permit data structure for the profile, wherein the permit data structure provides a criterion defining which users can interact with the profile using the determined message type. The asset transfer processing platform may be further configured to process the request data to determine the presence of a cryptographic signature used to sign the request data and, based on the determination of the presence of a cryptographic signature used to sign the request data, further process the request data to extract data items from the request data to be used in the determination of a response using the identified message response protocol. The asset transfer processing platform may also be configured to apply the identified message response protocol to the extracted data items. The identified message response protocol may comprise a series of criteria which are used to determine whether a response can be provided and what that response may be. The message response protocol may generate a response to the message based on the message response protocol, the extracted data items and the permissions data structure by determining, using the permit data structure, whether the user has the required cryptographic rights to interact with the profile using the identified message type, determining, using the message response protocol, whether the extracted data items meet the requirements of the determined message type; and based on the requirements of the determined message type, generating response content by interacting with the at least one event stream associated with the profile.

A method in accordance with the fourth aspect provides a platform by which a user can interact with an event stream associated with an account. The interaction is determined by the permissions provided by a permit data structure which provides cryptographic security for the interaction. This means that some interactions can be allowed by the permit where some interactions may not Viewed from a further aspect, there is a computer-implemented method of validating at least one data item. The data item may be provided during an asset transfer event. The data item may be an alphanumeric sequence of characters. The data item may be a number. The data item may be a randomly generated or pseudorandomly generated string. The method may be implemented by a processing resource which may be any computing device. The processing resource may be a payment processing resource. The method may comprise receiving request data from a computing device. The request data may be passed in an application programming interface (API) call. The request data may be transmitted using a data communications network.

The request data may comprise an instruction data set comprising an identifier for an entity associated with the asset transfer event. The request data may comprise a challenge data structure, where the challenge data structure may comprise a first numerical identifier for the at least one data item; and/or a representation of the at least one data item. The representation may an alphanumeric sequence. The representation may be a hash of the at least one data item.

The method may further comprise determining the validity of the at least one data item by determining concurrence between the representation of the at least one data item and a stored data item in a permit data structure associated with the entity by either determining the presence of a corresponding credential in the instruction data set or in the permit data structure. The corresponding credential may be a hash of the data item.

The method may further comprise generating a second numerical identifier for the corresponding credential in the respective instruction data set or permit data structure.

The method may further comprise generating response data comprising an identifier for the corresponding credential; and/or a second numerical identifier; and/or a signature associated with the first numerical identifier and the second numerical identifier.

The method may further comprise sending the response data to the computing device.

A method in accordance with the first aspect provides a method of securely validating a data item. The data item may be exchanged during an asset transfer event such as, for example, a transfer of funds. The data item is securely validated as the signature is only provided in the event the data item can be validated, either based on the permit data structure or another data structure. A plurality of data items may be provided and the method may be repeated for each of the plurality of data items. The provider of the response data structure needs to provide the signature associated with the first numerical identifier and the second numerical identifier to show they have validated the data item. The signature cannot be provided based on a permit data structure which the provider of the response data does not own as the owner's private key is required to generate that signature. The response data structure may identify the satisfying permit data structure (using, for example, a permit identifier) and this enables a party to determine a permit data structure which can be used to check the signature which has been used to generate the signature associated with the identifiers. The signature may be a cryptographic signature. The provider of the challenge data structure supplies a numerical identifier (the second numerical identifier) so that the provider of the response data structure cannot just replay a signature from a permit data structure they do not own. The provider of the response data structure supplies a numerical identifier so that the provider of the challenge data structure cannot simply "phish" for a signature over some useful message.

The first numerical identifier and the second numerical identifier may be nonces generated for the respective data item or response data. The first and second numerical identifiers may be nonces which are based on the respective data item or response data. The combination of the first numerical identifier and the second numerical identifier may be a concatenation of the first numerical identifier and the second numerical identifier, wherein the second numerical identifier may be positioned first in the concatenation of the first numerical identifier and the second numerical identifier.

The method may comprise determining concurrence between the representation of the data item and a stored data item in a permit data structure associated with the entity by:

obtaining the representation of the data item from the challenge data structure;

querying the instruction data set for a credential corresponding to the data item; and based on the query, retrieving an identifier corresponding to the credential or querying a permit data structure associated with the identifier for the entity for a credential corresponding to the data item; and based on the query of the permit data structure, retrieving an identifier corresponding to the credential corresponding to the data item. The method may further comprise generating response content comprising an indication of validation of the data item.

The query may only return a credential corresponding to the data item if the respective instruction data or permit data structure contains a field containing an identical representation of the data item. The query provides a rejection response if the respective instruction data or permit data structure does not contain a field containing an identical representation of the data item.

The challenge data structure further may comprise an identifier for the challenge data structure and the response data comprises an identifier for the response data structure. The identifier for the challenge data structure and the response data structure may correspond in some suitable way. This may mean the response data structure refers to the challenge data structure. The identifier for the challenge data structure may be identical to the identifier for the response data structure. The identifier for the response data structure provides the advantage of a recordable link between the response data structure and the challenge data structure and the corresponding permit data structure.

Viewed from a further aspect, there is provided a computer-implemented method of validating at least one data item during an asset transfer event. The method may be implemented by a first processing resource. The method may comprise generating request data. The request data may comprise:

an instruction data set which may comprise an identifier for an entity associated with the asset transfer event and/or a challenge data structure, where the challenge data structure comprises:

a first numerical identifier for the at least one data item; and/or a representation of the at least one data item.

The method may comprise sending the request data to a second processing resource. The request data may be sent using any suitable means such as data communications network or API call.

The method may comprise receiving response data from the second processing resource.

The method may comprise validating the data item by determining from the response data the presence of a signature of a combination of a second numerical identifier combined with the first numerical identifier.

A method in accordance with the second aspect provides a method of validating a data item which involves sending to a second processing resource request data comprising a challenge data structure which identifies the data item and comprises a representation for the data item. The data item can only be determined if the signature is provided. The signature can be checked using a permit identifier which may be provided in the response data.

The first and second aspects may be implemented using a suitably configured system.

Viewed from a further aspect, there is provided a computer-implemented method of appending entries to at least one event stream. An event stream may comprise a blockchain-supported append-only log wherein data recorded in a blockchain transaction is added to a log which is ordered in time. That is to say, an event stream logs data recorded on the blockchain in time order, i.e. as they appear on the blockchain. An event stream can be implemented using any suitable data structure. An event stream may comprise a series of entries which are stored in a sequence wherein each entry in the sequence is referenced in the sequence by a monotonically increasing number. That is to say, the first entry in an event stream is entry 1, the second entry is entry 2 and so on. The utilisation of an underlying blockchain means that it can be guaranteed that individual entries in the event stream have not be modified since they were written, no entries have been inserted between previously contiguous entries, no entries have been removed and no entries have been re-ordered. It is also not possible for unauthorised parties to append events to an event stream.

The at least one event stream may pertain to an asset account associated with a user registered on an asset transfer platform. The registration of the user may comprise the generation of a profile on the asset transfer platform. The profile may correspond to an instance of a processing resource such as, for instance, a payment processing resource. The method implemented on a processing resource. The processing resource may comprise a hardware-based resource or a software-based resource. The method may comprise receiving a request to append an entry to the at least one event stream, the entry comprising instruction data and an identifier for the at least one event stream. The request may be received through a data communications network or an API call which receives the identifier for the at least one event stream as a parameter. The identifier for the at least one event stream may also identify an instance of a payment processing resource.

The method may comprise retrieving the identifier for the at least one event stream from the request. Based on the identifier, the method may further comprise accessing the at least one event stream and obtaining a log of previous entries associated with the identified at least one event stream. The log of previous entries may be limited by a number of entries or by a pre-defined time period, i.e. a number of seconds, minutes, hours, days, months or years.

The method may comprise retrieving the instruction data from the request. The instruction data may comprise data items identifying an account, parties associated an account, a permit data structure associated with the account and account managers.

The method may comprise generating a unique identifier for the instruction data. The generation of the unique identifier may comprise the retrieval of the unique identifier from the instruction data. The unique identifier may be a cryptographic signature used to sign the instruction data. The generation of the unique identifier may also comprise generating the unique identifier by applying a hashing algorithm to the instruction data or another suitable technique.

Based on the generated unique identifier, the method may further comprise determining whether data identical to the instruction data is present in the log of previous entries associated with the identified event stream. This may be by using the generated unique identifier as a search key in the log of previous entries.

Based on the outcome of the determining step, the method may further comprise either appending an entry to the at least one event stream, the entry comprising the unique identifier for the instruction data; or rejecting the entry to the event stream as a duplicated entry.

A method in accordance with any of the aspects prevents duplicated entries from being placed on an event stream. This is important as duplicated entries can comprise the immutability of the event stream and this reduces the belief in the integrity of the data recorded thereon.

The unique identifier for the instruction data may comprise a cryptographic signature used to cryptographically sign the instruction data. The cryptographic signature may be generated using ECDSA techniques. The cryptographic signature may be retrieved from a permit data structure associated with an entity associated with the transaction.

The request may be to append an entry to a plurality of event streams and the method may further comprise retrieving the identifier for each of the plurality of event streams from the request. The request may further comprise identifying each of the plurality of event streams and corresponding logs of previous entries. The method may further comprise using the unique identifier as a search key, determining whether data identical to the instruction data has been previously added to any of the logs. Based on the outcome of the determining step, the method further comprises either appending the entry to each of the event streams using the unique identifier; or reject the entry to the plurality of the event streams.

The effect of this is that, where a request identifies multiple event streams, the transaction cannot be processed even if it has already been recorded in one of those event streams.

The method may further comprise determining, from the instruction data, a condition on the at least one event stream which must be satisfied for the entry to be added to the at least one event stream, and determining whether the condition has been satisfied prior to adding the entry to the at least one event stream. The condition may be that the index of the event stream must be less than or equal to an integer defined in the instruction data and/or the entry is added to the event stream within a pre-determined time-period.

The processing resource may be configured to maintain the log at a maximum size by removing entries which have been present in the log for longer than a pre-defined maximum period of time.

Upon receipt of a further request received at substantially the same time as the request to append an entry to the at least one event stream, the further request comprising identical instruction data to the request to append an entry to the at least one event stream, the method comprises rejecting both requests. The effect of this is that the data integrity of the event stream is not compromised by a situation where instruction data is sent twice at the same time, i.e. before the processing could take place to realise there is a duplicate in the log of entries.

Embodiments in accordance with any of the aspects may be combined either in part or in full.

Specific embodiments are now described by way of illustration with reference to the accompanying drawings, in which like reference numerals refer to like features.

We now describe, with reference to FIG. 1a, a system 100 which enables a transfer of an asset between a first user and second user of the system 100 to be recorded.

System 100 comprises first computing device 102 and second computing device 104. First computing device 102 and second computing device 104 may be any computing resource. Each of first computing device 102 and second computing device 104 are configured to interact with payment processing resource 106 via respective first and second application programming interface (API) 108.

The payment processing resource 106 is configured to initialise and/or interact with event streams provided in respect of at least each of the first user named Alice (110a), the second user named Bob (110b) and the payment processing resource (110c) using the event stream resource 110. The initialisation and interaction with an event stream by the payment processing resource 106 will be understood from UK Patent Application No. 2102314.8 filed on 18 Feb. 2021 in the name of nChain Holdings Limited.

As will be further described below, the payment processing resource 106 may be configured to interact with the event stream resource 110 which provides a sequential log of transactions processed using the payment processing resource 106.

The blockchain 112 comprises at least one public proof-of-work blockchain in accordance with the Bitcoin Satoshi Vision (BSV) protocol in that it is an append-only ledger of blocks (BSV1, BSV2, BSV3) which are made up of transactions.

Figure 1B:
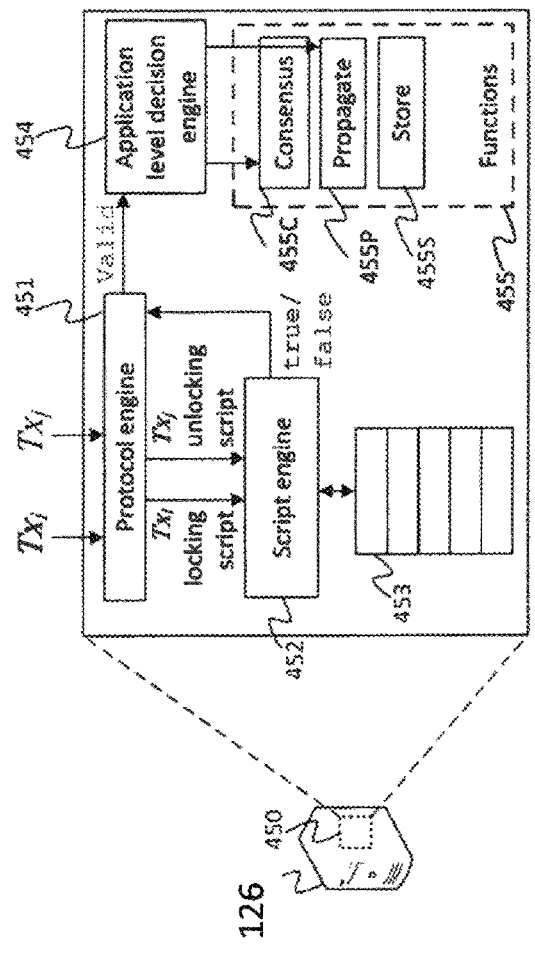
FIG. 1b illustrates a node configured to implement the Bitcoin software in order to validate a blockchain transaction.
Figure 1C:
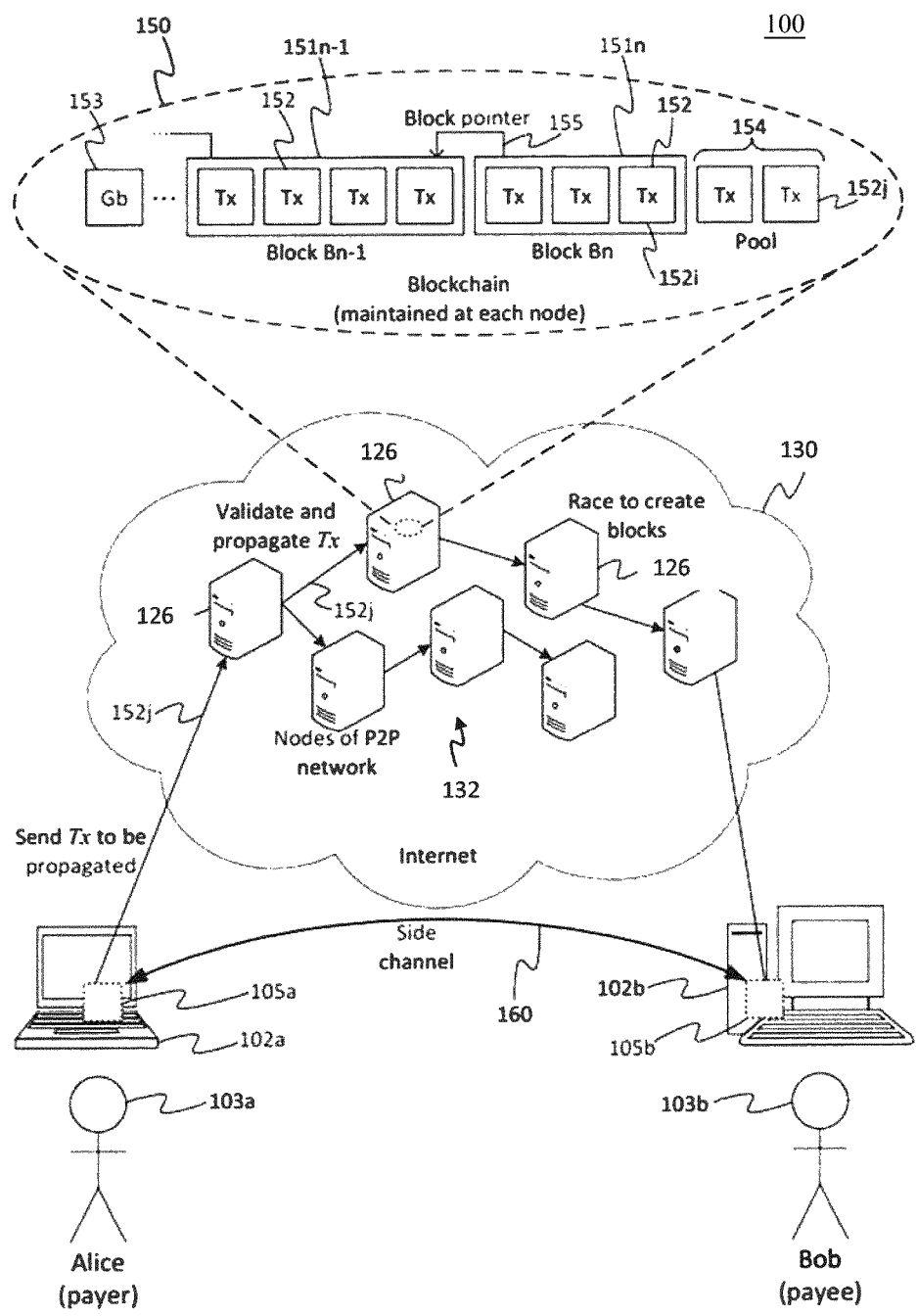
FIG. 1c illustrates a blockchain network.

The blockchain 112 comprises a plurality of nodes 126 configured by the software which is now described in relation to FIG. 1b. Each node is configured in accordance with this software as part of the blockchain as described below in relation to FIG. 1c FIG. 1b illustrates an example of the node software 450 that is run on each blockchain node 126 of the network 132, in the example of a UTXO- or output-based model. Note that another entity may run node software 450 without being classed as a node 126 on the network 132, i.e. without performing the actions required of a node 126. The node software 450 may contain, but is not limited to, a protocol engine 451, a script engine 452, a stack 453, an application-level decision engine 454, and a set of one or more blockchain-related functional modules 455. Each node 126 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152j (Tx$_j$) is received having an input pointing to an output (e.g. UTXO) of another, preceding transaction 152i (Tx$_{m-1}$), then the protocol engine 451 identifies the unlocking script in Tx$_j$ and passes it to the script engine 452. The protocol engine 451 also identifies and retrieves Tx$_i$ based on the pointer in the input of Tx$_j$. Tx$_i$ may be published on the blockchain 150, in which case the protocol engine may retrieve Tx$_i$ from a copy of a block 151 of the blockchain 150 stored at the node 126. Alternatively, Tx$_i$ may yet to have been published on the blockchain 150. In that case, the protocol engine 451 may retrieve Tx$_i$ from the ordered set 154 of unpublished transactions maintained by the node 126. Either way, the script engine 451 identifies the locking script in the referenced output of Tx$_i$ and passes this to the script engine 452.

The script engine 452 thus has the locking script of Tx$_i$ and the unlocking script from the corresponding input of Tx$_j$. For example, transactions labelled Tx$_0$ and Tx$_1$, are illustrated in FIG. 1b, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of Tx$_j$ does not exceed the total amount pointed to by its inputs, and that the pointed-to output of Tx$_i$ has not already been spent by another valid transaction. The protocol engine 451 evaluates the result from the script engine 452 together with the one or more protocol-level conditions, and only if they are all true does it validate the transaction Tx$_j$. The protocol engine 451 outputs an indication of whether the transaction is valid to the application-level decision engine 454. Only on condition that Tx$_j$ is indeed validated, the decision engine 454 may select to control both of the consensus module 455C and the propagation module 455P to perform their respective blockchain-related function in respect of Tx$_j$. This comprises the consensus module 455C adding Tx$_j$ to the node's respective ordered set of transactions 154 for incorporating in a block 151, and the propagation module 455P forwarding Tx$_j$ to another blockchain node 126 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 126. However, it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 126 may be replaced with reference to a blockchain network 106, blockchain 150 and blockchain node 126 respectively. The blockchain, blockchain network and/or blockchain nodes may share some or all of the described properties of the bitcoin blockchain 150, bitcoin network 106 and bitcoin nodes 126 as described above.

In preferred embodiments of the invention, the blockchain network 132 is the bitcoin network and bitcoin nodes 126 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 132).

In non-preferred embodiments of the invention, the blockchain network 132 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 126 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 126.

Even more generally, any reference to the term "bitcoin node" 126 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 126.

FIG. 1c shows an example system 100 for implementing a blockchain 150. The system 100 may comprise of a packet-switched network 130, typically a wide-area internetwork such as the Internet. The packet-switched network 130 comprises a plurality of blockchain nodes 126 that may be arranged to form a peer-to-peer (P2P) network 132 within the packet-switched network 130. Whilst not illustrated, the blockchain nodes 126 may be arranged as a near-complete graph. Each blockchain node 126 is therefore highly connected to other blockchain nodes 126.

Each blockchain node 126 comprises computer equipment of a peer, with different ones of the nodes 126 belonging to different peers. Each blockchain node 126 comprises processing apparatus comprising one or more processors, e.g. one or more central processing units (CPUs), accelerator processors, application specific processors and/or field programmable gate arrays (FPGAs), and other equipment such as Application Specific Integrated Circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 126 in the distributed or blockchain network 130. As mentioned above, maintaining a copy of the blockchain 150 does not necessarily mean storing the blockchain 150 in full. Instead, the blockchain 150 may be pruned of data so long as each blockchain node 150 stores the blockheader (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 126 is configured to forward transactions 152 to other blockchain nodes 126, and thereby cause transactions 152 to be propagated throughout the network 132. Each blockchain node 126 is configured to create blocks 151 and to store a respective copy of the same blockchain 150 in their respective memory. Each blockchain node 126 also maintains an ordered set 154 of transactions 152 waiting to be incorporated into blocks 151. The ordered set 154 is often referred to as a "mempool". This term herein is not intended to limit to any particular blockchain, protocol or model. It refers to the ordered set of transactions which a node 126 has accepted as valid and for which the node 126 is obliged not to accept any other transactions attempting to spend the same output.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the ordered set 154 or any block 151. The preceding transaction 152i need not necessarily exist at the time the present transaction 152j is created or even sent to the network 132, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the input authorisation, for example the signature of the user 103a to whom the output of the preceding transaction 152i is locked. In turn, the output of the present transaction 152j can be cryptographically locked to a new user or entity 103b. The present transaction 152j can thus transfer the amount defined in the input of the preceding transaction 152i to the new user or entity 103b as defined in the output of the present transaction 152j. In some cases a transaction 152 may have multiple outputs to split the input amount between multiple users or entities (one of whom could be the original user or entity 103a in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when an entity, such as a user or machine, 103 wishes to enact a new transaction 152j, then the entity sends the new transaction from its computer terminal to a recipient. The entity or the recipient will eventually send this transaction to one or more of the blockchain nodes 126 of the network 132 (which nowadays are typically servers or data centres, but could in principle be other user terminals). It is also not excluded that the entity 103 enacting the new transaction 152j could send the transaction to one or more of the blockchain nodes 126 and, in some examples, not to the recipient. A blockchain node 126 that receives a transaction checks whether the transaction is valid according to a blockchain node protocol which is applied at each of the blockchain nodes 126. The blockchain node protocol typically requires the blockchain node 126 to check that a cryptographic signature in the new transaction 152j matches the expected signature, which depends on the previous transaction 152i in an ordered sequence of transactions 152. In such an output-based transaction protocol, this may comprise checking that the cryptographic signature or other authorisation of the entity 103 included in the input of the new transaction 152j matches a condition defined in the output of the preceding transaction 152i which the new transaction assigns, wherein this condition typically comprises at least checking that the cryptographic signature or other authorisation in the input of the new transaction 152j unlocks the output of the previous transaction 152i to which the input of the new transaction is linked to. The condition may be at least partially defined by a script included in the output of the preceding transaction 152i. Alternatively it could simply be fixed by the blockchain node protocol alone, or it could be due to a combination of these. Either way, if the new transaction 152j is valid, the blockchain node 126 forwards it to one or more other blockchain nodes 126 in the blockchain network 132. These other blockchain nodes 126 apply the same test according to the same blockchain node protocol, and so forward the new transaction 152j on to one or more further nodes 126, and so forth. In this way the new transaction is propagated throughout the network of blockchain nodes 126.

In an output-based model, the definition of whether a given output (e.g. UTXO) is assigned is whether it has yet been validly redeemed by the input of another, onward transaction 152j according to the blockchain node protocol. Another condition for a transaction to be valid is that the output of the preceding transaction 152i which it attempts to assign or redeem has not already been assigned/redeemed by another transaction. Again if not valid, the transaction 152j will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 126 also race to be the first to create blocks of transactions in a process commonly referred to as mining, which is supported by "proof-of-work". At a blockchain node 126, new transactions are added to an ordered set 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered set of transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 126 that is trying to solve the puzzle.

The first blockchain node 126 to solve the puzzle announces this to the network 132, providing the solution as proof which can then be easily checked by the other blockchain nodes 126 in the network (once given the solution to a hash it is straightforward to check that it causes the output of the hash to meet the condition). The first blockchain node 126 propagates a block to a threshold consensus of other nodes that accept the block and thus enforce the protocol rules. The ordered set of transactions 154 then becomes recorded as a new block 151 in the blockchain 150 by each of the blockchain nodes 126. A block pointer 155 is also assigned to the new block 151n pointing back to the previously created block 151n-1 in the chain. A significant amount of effort, for example in the form of hash, required to create a proof-of-work solution signals the intent of the first node 126 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 126 in the blockchain network 132. The block pointer 155 also imposes a sequential order to the blocks 151. Since the transactions 152 are recorded in the ordered blocks at each blockchain node 126 in a network 132, this therefore provides an immutable public ledger of the transactions.

Note that different blockchain nodes 126 racing to solve the puzzle at any given time may be doing so based on different snapshots of the ordered set of yet to be published transactions 154 at any given time, depending on when they started searching for a solution or the order in which the transactions were received. Whoever solves their respective puzzle first defines which transactions 152 are included in the next new block 151n and in which order, and the current set 154 of unpublished transactions is updated. The blockchain nodes 126 then continue to race to create a block from the newly defined outstanding ordered set of unpublished transactions 154, and so forth. A protocol also exists for resolving any "fork" that may arise, which is where two blockchain nodes 126 solve their puzzle within a very short time of one another such that a conflicting view of the blockchain gets propagated between nodes 126. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 126 is granted the ability to assign an accepted amount of the digital asset in a new special kind of transaction which distributes a defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 126 that created the block 151n in which that transaction was published. This fee is normally referred to as the "transaction fee", and is discussed blow.

Due to the resources involved in transaction validation and publication, typically at least each of the blockchain nodes 126 takes the form of a server comprising one or more physical server units, or even whole a data centre. However in principle any given blockchain node 126 could take the form of a user terminal or a group of user terminals networked together.

The memory of each blockchain node 126 stores software configured to run on the processing apparatus of the blockchain node 126 in order to perform its respective role or roles and handle transactions 152 in accordance with the blockchain node protocol. It will be understood that any action attributed herein to a blockchain node 126 may be performed by the software run on the processing apparatus of the respective computer equipment. The node software may be implemented in one or more applications at the application layer, or a lower layer such as the operating system layer or a protocol layer, or any combination of these.

Also connected to the network 130 is the computer equipment of each of a plurality of parties 103 in the role of consuming users. These users may interact with the blockchain network but do not participate in validating, constructing or propagating transactions and blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 126).

Some or all of the parties 103 may be connected as part of a different network, e.g. a network overlaid on top of the blockchain network 132. Users of the blockchain network (often referred to as "clients") may be said to be part of a system that includes the blockchain network; however, these users are not blockchain nodes 126 as they do not perform the roles required of the blockchain nodes. Instead, each party 103 may interact with the blockchain network 132 and thereby utilize the blockchain 150 by connecting to (i.e. communicating with) a blockchain node 132. Two parties 103 and their respective equipment are shown for illustrative purposes: a first party 103a and his/her respective computer equipment 102a, and a second party 103b and his/her respective computer equipment 102b. First computing device 102 and second computing device 104 may be configured to implement any of the functionality of respective computer equipment 102a or 102b. It will be understood that many more such parties 103 and their respective computer equipment may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment of each party 103 comprises respective processing apparatus comprising one or more processors, e.g. one or more CPUs, GPUs, other accelerator processors, application specific processors, and/or FPGAs. The computer equipment of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment of each party 103 stores software comprising a respective instance of at least one client application 105 arranged to run on the processing apparatus. It will be understood that any action attributed herein to a given party 103 may be performed using the software run on the processing apparatus of the respective computer equipment. The computer equipment of each party 103 comprises at least one user terminal, e.g. a desktop or laptop computer, a tablet, a smartphone, or a wearable device such as a smartwatch. The computer equipment of a given party 103 may also comprise one or more other networked resources, such as cloud computing resources accessed via the user terminal.

The client application 105 may be initially provided to the computer equipment of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc. Client application 105 corresponds respectively to 105a and 105b on the devices 102a and 102b illustrated in FIG. 1c.

The client application 105 comprises at least a "wallet" function. This has two main functionalities. One of these is to enable the respective party 103 to create, authorise (for example sign) and send transactions 152 to one or more bitcoin nodes 126 to then be propagated throughout the network of blockchain nodes 126 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment is operatively coupled to at least one of the blockchain nodes 126 of the network 132. This enables the wallet function of the client 105 to send transactions 152 to the network 132. The client 105 is also able to contact blockchain nodes 126 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment is configured to formulate and send transactions 152 according to a transaction protocol. As set out above, each blockchain node 126 runs software configured to validate transactions 152 according to the blockchain node protocol, and to forward transactions 152 in order to propagate them throughout the blockchain network 132. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 126 in the network 132.

When a given party 103, say Alice, wishes to send a new transaction 152_j_ to be included in the blockchain 150, then she formulates the new transaction in accordance with the relevant transaction protocol (using the wallet function in her client application 105). She then sends the transaction 152 from the client application 105 to one or more blockchain nodes 126 to which she is connected. E.g. this could be the blockchain node 126 that is best connected to Alice's computer. When any given blockchain node 126 receives a new transaction 152_j_, it handles it in accordance with the blockchain node protocol and its respective role. This comprises first checking whether the newly received transaction 152_j_ meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152_j_ passes the test for being deemed valid (i.e. on condition that it is "validated"), any blockchain node 126 that receives the transaction 152_j_ will add the new validated transaction 152 to the ordered set of transactions 154 maintained at that blockchain node 126. Further, any blockchain node 126 that receives the transaction 152_j_ will propagate the validated transaction 152 onward to one or more other blockchain nodes 126 in the network 132. Since each blockchain node 126 applies the same protocol, then assuming the transaction 152_j_ is valid, this means it will soon be propagated throughout the whole network 132.

Once admitted to the ordered set of transactions 154 maintained at a given blockchain node 126, that blockchain node 126 will start competing to solve the proof-of-work puzzle on the latest version of their respective ordered set of transactions 154 including the new transaction 152 (recall that other blockchain nodes 126 may be trying to solve the puzzle based on a different ordered set of transactions 154, but whoever gets there first will define the ordered set of transactions that are included in the latest block 151. Eventually a blockchain node 126 will solve the puzzle for a part of the ordered set 154 which includes Alice's transaction 152_j_). Once the proof-of-work has been done for the ordered set 154 including the new transaction 152_j_, it immutably becomes part of one of the blocks 151 in the blockchain 150.

Each transaction 152 comprises a pointer back to an earlier transaction, so the order of the transactions is also immutably recorded.

Different blockchain nodes 126 may receive different instances of a given transaction first and therefore have conflicting views of which instance is 'valid' before one instance is published in a new block 151, at which point all blockchain nodes 126 agree that the published instance is the only valid instance. If a blockchain node 126 accepts one instance as valid, and then discovers that a second instance has been recorded in the blockchain 150 then that blockchain node 126 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

Transactions recorded in the blockchain 112 model a transfer of value which is either spent or unspent and protected by a locking script. A transaction spends value through its inputs and pays value forward via its outputs. The value input to a transaction must equal or exceed the value output by a previous transaction, with any surplus input collected as a transaction fee. A transaction is invalid if: the solutions presented to locking scripts, i.e. unlocking scripts, are incorrect; if it outputs more value than is taken as input; if it spends output that has already been spent or it attempts to spend value which does not exist at all.

Both locking scripts and unlocking scripts are expressed in machine-readable scripting language allowing for a large variety of scripted spending conditions, including scripts which can embed arbitrary data (in the form of a provably unspendable output) as a data carrier output.

The payment processing resource 106 in FIG. 1_a_ may be configured to interact with the blockchain 112. This may be in the generation of a blockchain transaction where it may retrieve unspent outputs to use as the basis for inputs to further blockchain transactions. On generation of a blockchain transaction, the payment processing resource 106 may record the generation of the blockchain transaction as an event in a corresponding event stream implemented by event stream manager 110. Additional details of the functionality of event streams may be found in GB2002285.1 filed in the name of nChain Holdings Limited, GB2020279.2 filed in the name of nChain Holdings Limited and PCT/IB2021/051261 filed in the name of nChain Holdings Limited.

The payment processing resource 106 in FIG. 1_a_ is configured to interact with a key storage module 122 and a payment data store 124. The key storage module 122 is configured to store cryptographic keys corresponding to the accounts of parties who use the payment processing resource 106 to enable transactions to take place. The key storage module 122 may utilise any suitable storage and will utilise a database management system (DBMS) to initialise, store and retrieve data from records inside a database of the parties who store cryptographic keys in the key storage module 122. The payment data store 124 is configured to store data related to any payments which are implemented using the payment processing resource 106.

The interaction between respective computing devices and the payment processing resource 106 may be determined in accordance with permit data structures which are generated by the payment processing resource 106.

We now describe the concept of a permit data structure relating to a permit associated with a user of the payment processing resource 106. Permits provide a way to identify a user and state what that user is able to do. The identification aspect is conducted through use of public key cryptography and the aspect related to the authorisation of that user is managed by the use of permissions.

Permits provide a way to identify a user and state what that permit holder is able to do. The identification aspect is conducted through use of public key cryptography and the "what a holder can do" is conducted through use of permissions as described herein.

In an embodiment, each permit has an associated permit data instance (which is also described as associated permit data or permit data). Permit data instance comprises data about the permit itself as well as the permissions which set out what the holder of the permit can do. Optionally, each permit comprises at least one permission and more Optionally, a plurality of permissions. A permission is configured to determine what the holder of the permit is able to do. Optionally, a permission is defined by a name-value (also called a key-value) pair. Optionally the name is a string of characters. More optionally, the string of characters is human readable and provides an indication as to what the permission relates to. Optionally, the value is a string, number, or a data structure where the data structure is a name-value pair or pairs. Permissions are optionally of the form as discussed in further detail below under the heading "Permissions". Where referring to a permit comprising a permission or permissions as used herein, this optionally refers to the permit data instance comprising a name-value permission. Permissions are optionally provided in sets or groups (called permissionSets in an example described herein). Optionally groups of permission(s) are part of each permit as an "extension".

Each permit also comprises data such that the identity of the holder of the permit can be verified. Optionally the permit comprises a public key associated with the holder of the permit. Verification of the identity of the permit holder can be determined by the holder signing a message (or any data) with their private key then the party verifying the identity of the permit holder can compare the signature and message against the public key associated with the permit holder. Optionally the public key associated with the permit holder is stored in the associated permit data instance.

Optionally, each permit is identified by a permit identifier. Optionally, the permit identifier provides no indication as to the contents of the permit. Optionally, the permit identifier is a pseudo-randomly generated string.

In an embodiment, the system provides a method of verifying a user's signature against their permit thus verifying that the user is or is not the holder of the permit.

Figure 1D:
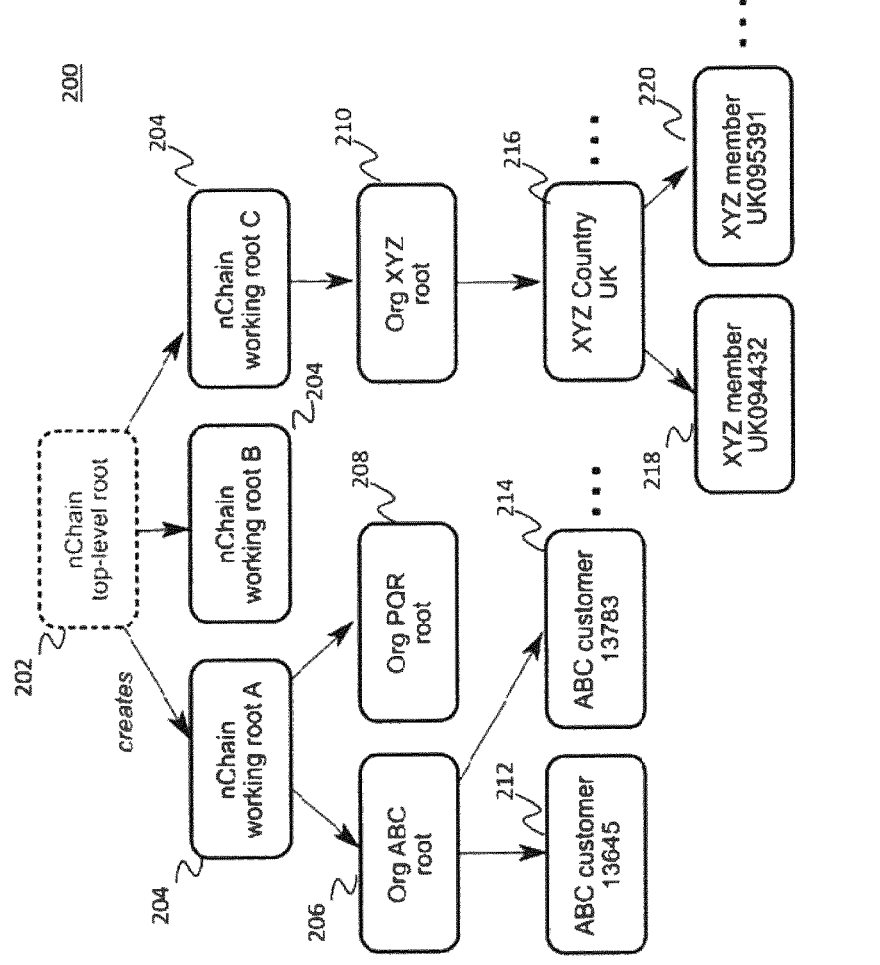
FIGS. 1d, 1e and 1f illustrate example hierarchical permit structures.

Optionally, permits are part of a hierarchy. Referring to FIG. 1*d*, a hierarchy of permits 200 are shown. All permits (except for the root 202) will have a parent permit and optionally a child or children permits. Optionally, a child permit cannot have more than one parent. The resulting permit hierarchy structure is a tree. Parent permits are able to create child permits.

Optionally, permits comprise a set of rules which allows permit holders to create child permits containing permissions within a given "domain" or "namespace", but not across to other domains or namespaces. Using these namespaces prevent separate organisations from interfering with other organisations using the permit system. The set of rules can be found in the Special Permissions as discussed below.

Further, the set of rules allows delegation of powers to child permits, giving them rights to create grandchildren within the domain or namespace, and recursively downwards, subject to optional depth and total count limits.

The top-level root permit 202 has the ability to create a large or even unlimited number of child permits with little to no limitations. With such a broad ranging ability, the private/public key pair used in creation of the root permit is optionally securely managed. Optionally, the private key associated with the root permit is kept offline on a secure device.

The creation of the top-root permit 202 (and not an organisation level root permit 206, 208, 210) is a one-time process. The method is similar to the creation of a child permit, except there is no parent permit to refer to and as such, all the checks that relate to checking a parent's permissions, authentication, authorisation, and other features are skipped or otherwise ignored. In the present embodiment, this is optionally only be run once and never again.

In the example permit hierarchy 200 of FIG. 1*d*, there are four different organisations that are using permits. nChain (TM) are the holders of the root permit, and Org ABC, Org PQR, and Org XYZ are all using permits that are children of nChain's permits. A skilled person will understand that specific companies are used by way of example only. Further, any number of organisations may be present in such a permit system. The example hierarchies and organisations shown in FIG. 1*d* exemplify the flexibility of permit construction when using a number of the present embodiments described herein.

Continuing with the example, Org ABC has an organisation level root permit 206. This a root permit in that it is the root of Org ABC's permits and not the top-level root 202 of the entire tree. Org ABC has created at least two child permits 212, 214. These child permits are for different customers and/or end users.

Org XYZ has a root permit 210. Org XYZ has chosen to have a different hierarchy structure where there is a permit per-country. The XYZ UK permit 216 is shown with at least two permits 218, 220 for members and/or end users.

In an embodiment, the holder of the root permit creates a number of child permits 204 with the same holder. These child permits are configured such that they can create further child 206, 208, 210 permits for other users of the system. This way, the top-level root permit 202 does not need to be used for further permit creation every time a new user or organisation wants a permit. Thus reducing the chances of an attack occurring and improving security of the root permit.

Optionally, every permit contains a reference to its parent and one or more named permissions. Upon creation, the parent will supply data indicative of a set of permissions and a public key associated with the permit holder (holder-PubKey). As can be seen in the example permit data instance below, permissions are stored under the extensions ["default"] object by default.

Optionally, permit information is tracked in a data structure called a permit data instance or permit data. The data structure comprises at least some of the following elements presented in the table below. Optionally all of the elements are required. Some of the values to the elements can be set to null, zero, or are zero length. More optionally, the parent is required and not null.

Optionally, each permit has a defined validity period. Optionally, the permit is valid from the current time until an end time and date and more optionally wherein the end date and time is set in the permit data instance under the "revoked" element. Once revoked, a permit may not be reactivated.

Optionally, determining whether a permit has been revoked or not depends on the current time. Each permit comprises a "revoked" element that comprises a time. For a permit to be considered revoked, the current time must be after the revoked time stored on the permit. More optionally and in accordance with a further embodiment, there is provided a method where a permit is provided a time in the future and it returns whether it will be valid at that time or not.

Optionally a map of named permissions are referenced by their name in the extensions map. The name 'default' will be used when storing the initial extension.

Alternatively, no extensions map is used and only one set of permissions are associated with the permit.

An example permit data instance with all of the elements used (although some are set to null) is shown below in JSON format.

```
{
    "parent": " < instanceId of parent > ",
    "extensions": {
        "default": {
            "holderPubKey": "12c6DSiU4Rq3P4ZxziKxzrL5...",
            "revoked": null,
            "permissionSet": {
                "$.children.namespace": [
                    "com.example.user",
                    "com.example.country.uk"
                ],
                "$.children.levels": 2,
                "$.children.max": [10, 10],
                "$.extensions.max": 2,
                "$.root": false,
                "$.valid.after": "2021-11-16T10:30:05Z",
                "$.valid.before": "2022-11-16T10:30:05Z"
                "com.example.distributor": {
                    "id": " < UUID > ",
                    "name": "uk321"
                }
            }
        },
    },
    "children": [
        " < instanceId of child 1 > ",
        " < instanceId of child 2 > ",
    ],
    "revoked": null,
}
```

A skilled person will understand that the above is an example permit and that some features of this permit data instance may be removed, not used, or modified depending on the particular embodiment described herein. A skilled person will further understand that JSON is provided here by way of example of representing the permit. The permit and its contents may be represented using other formats such as XML, a binary encoded format, or any other appropriate format.

Figure 1F:
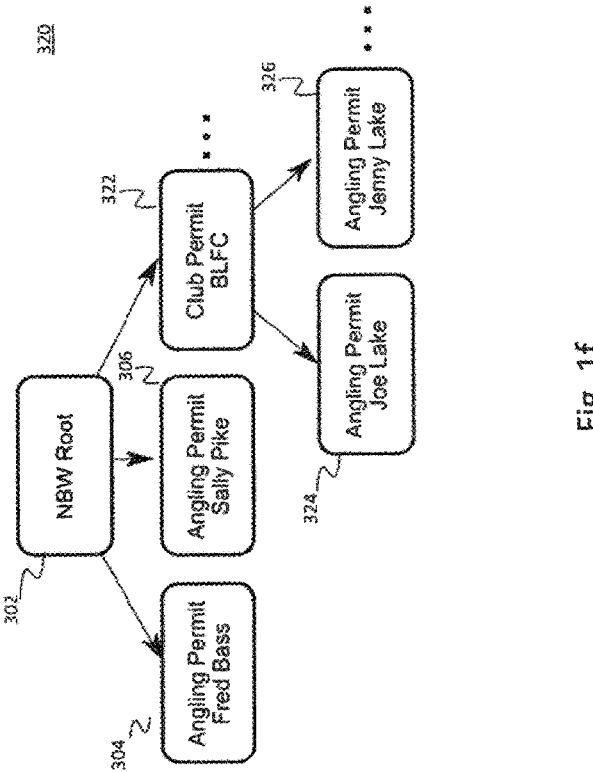
Figure 1E:
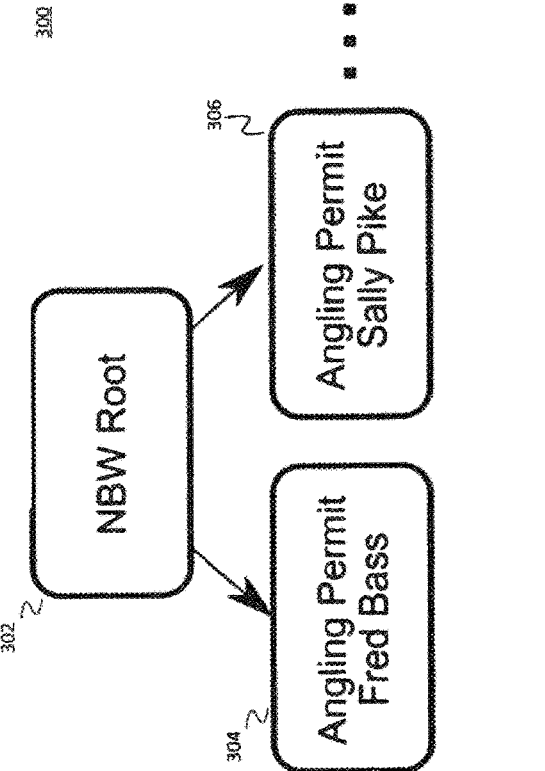

Referring to FIG. 1e, a simple example is shown (which has left out the ultimate, top-level root permit). Here the organisation's root permit 302 has at least two child permits 304, 306. The organisation is the NBW (National Bureau of Waterways) which issues fishing permits 304, 306 (limited to anglers in the present example). Optionally, the NBW provide a mobile application which holds the identifier to the holder's permit and a secret key which allows the holder of the permit to verify they hold it. Each angler's permit 304, 306 comprises a permission called "org.nbw.angler.rights" and optionally has the following structure:

```
{
    "type": "rod",
    "species": ["carp", "tench", "pike"]
}
```

Optionally, there are other permissions associated with personal identity such as a membership number and the user's name.

In use, a fishing inspector that is wishing to confirm that a user (such as Fred Bass who holds the first child permit 304) is fishing with the correct type of equipment and catching the correct type of fish could use this permit to do so. The inspector can use the permit identifier (optionally obtained from Fred Bass' phone via a QR code). With this permit identifier, the inspector can query the permit instance themselves to validate both the permissions (so that Fred Bass is using a rod and only catching carp, trench, or pike) and the identity (so that Fred is actually the holder of the permit and he has not copied someone else's permit identifier).

Permissions

Optionally the permissions are namespaced. More optionally, the permissions are namespaced by limiting what the name of the name-value pair can be. These namespaces use a reverse DNS domain-like structure separated by '.' (full stops). Some example namespaces are:

com.example.user.id com.example.user.type com.example.acme.user.id org.nbw.angler As can be seen, these namespaces are constructed from left to right where the left-most prefix is the least specific feature, and the right-most suffix is the most specific feature.

Optionally, both the name and value of the name-value pair of these permissions are customisable (as long as the name is within the parent permit's allowable namespace). Optionally, both the name and value can be any arbitrary value. Optionally, both the name and the value are supplied by a user of the permit system. Thus, the name and value are user generated. By providing user generated and/or customisable names and values, the use cases for permits can be very flexible, thereby allowing their use in a great number of different applications.

Optionally, namespaces can only get longer. This can also be understood as saying that a child permit's permissions can only be a subset of what is allowed according to the parent permission(s). Optionally the namespaces allow the permissions to be structured into a hierarchy (this is additional and separate to, although will often match, the permits also being hierarchical).

Optionally, the permission hierarchy follows the same structure as the permit. This can also be understood that each child permit comprises permissions that are a subset (namespace wise) of the parent.

A special set of permissions, prefixed with the '$' namespace, provide information and/or limitations about the permit itself. The '$' namespace provides limitations on what permissions these permits can add to child permits. These limitations can include:

Enforcement of one or more namespace prefixes on all permissions in children,

Delegation of rights to create further permits to children, recursively to a given depth, Limitation of numbers of children and further descendant that can be created, and/or Limitation of the number of extensions (discussed below under the heading "Extensions") that can be created.

Alternatively, the information stored in these special permissions (i.e. the limitations of the permit and other information) is not stored in special permissions and are instead stored on the permit data instance. Optionally, each of the limitations are stored as their own element on the permit data instance. A skilled person will appreciate that these limitations can be stored in any number different locations associated with the permit.

Optionally, the '$' namespace is also used to define the validity period of the permit.

TABLE 1

| Example Special ($) permissions | |
|---|---|
| Permission Name | Purpose/Description |
| $.children.namespace | Restrict permissions in child permits created by this permit to be prefixed with the given namespace (if a single string) or one of a set of namespaces (if an array of strings). If absent, no children may be created. |
| $.children.levels | Restrict ability to create child permits to the given depth. If 0 or absent, no children may be created. Children must have a value at least one less than their parent (if any). If absent or 0, no children may be created. |
| $.children.max | Restrict the numbers of child permits that can be created. If an array, the first element applies at this level and subsequent values apply to subsequent deeper levels. If absent, no limit to the number of children this permit can create. The child must pass down the constraint (with the first item removed) to its own children. |
| $.extensions.max | Restrict the number of extensions that this permit can have (including the default). If absent, no extensions can be added. |
| $.root | Special permission set only in the overall root permit (true/false) |
| $.valid.after | Time after which this set of permissions is valid (ISO 8601, inclusive) |
| $.valid.before | Time before which this set of permissions is valid (ISO 8601, exclusive) |

The special ($) namespace does not need to adhere to the "$.children.namespace" rules as set out above. Optionally, only a particular set of special permissions are possible to create. More optionally, the above set are the only special permissions a permit can have.

Optionally, the $.valid.after and $.valid.before permissions use local time. Optionally, the permissions are optional and are not required. Optionally, $.valid.after and $.valid.before define a validity period of the permit and/or extension. Optionally, if a parent has either of the $.valid.after and $.valid.before permissions set then any children created from it must pass on the same or a more narrow window of time. Thus it can be seen that the validity period of a child permit cannot exceed that of its parent permit.

These special permissions are Optionally stored only in the initial/default extension as these special permissions refer to the permit as a whole. Any special permissions stored in different extensions are either ignored or rejected.

Referring to the previous example of FIG. 1e, the NBW root permit 302 comprises at least the following permissions:

$.children.namespace="org.nbw"
$.children.levels=1

These permissions state that the holder of the NBW root permit 302 can create as many child permits as required as long as the child's permissions start with "org.nbw" and the children are only one level deep.

Referring to FIG. 1f, a further example permit structure 320 is shown here. The structure is similar to that as described with reference to FIG. 1e. The NBW root permit 302 has their "$.children.levels" permission equal to two (or more). In the present example, the NBW permit 302 holders would like to allow a club to create permits for its own members. The NBW permit 302 creates the Club Permit BLFC 322 (Big Lake Fishing Club) which comprises the following permissions:

org.nbw.club.id="BLFC"
$.children.namespace="org.nbw.angler"
$.children.levels=1
$.children.max=50

These permissions allow the BLFC to create up to 50 permits for its members, but only permissions that are within the namespace "org.nbw.angler". As such, permissions like "org.nbw.club.id" are not allowed for any children and therefore children cannot not impersonate the permissions of a club permit (for example, if a child permit comprised the permission "org.nbw.club.id", the child could pretend to be a club themselves and conduct any actions associated with a club) or any other similar permissions.

The BLFC permit 322 creates at least two child permits 324, 326. These child permits must have permissions that are prefixed with "org.nbw.angler".

Extensions

Optionally, permissions are stored in "extensions". Optionally the extensions comprise: sets of permissions (called permissionSets), a revoke element, and a holderPubKey element. The extensions are stored on the permit data instance in an extension map and are referenced by a name. Optionally, the name is user generated. Optionally, the name is human readable. Optionally, initial extension and/or default extension is labelled "default". Here, human readable is any encoding such that it can be naturally read by humans. Optionally, the encoding is ASCII or Unicode text.

Extensions optionally provide a way to reference a group of at least one permission. More optionally, permissions provides a human readable way to reference a group or set of at least one permission.

Each extension comprises a number of elements. Example elements of an extension is provided below in Table 2. Optionally all of them are required.

TABLE 2

| Extension Elements | | |
|---|---|---|
| Element Name | Data Type | Description |
| holderPubKey | String | A cryptographic (optionally Elliptic Curve) public key used to validate the identity of the permit holder. This key is optionally a Base64 encoded DER. |

TABLE 2-continued

Extension Elements

| Element Name | Data Type | Description |
|---|---|---|
| permissionSet | Optionally a JSON object | Each permission within a permission set is defined by a name-value pair (alternatively described as a key-value pair. The name is optionally a period separated namespace string (e.g. com.nchain) and the value may be a JSON string, array or object. Permission names inherit from the namespace of their parent. |
| Revoked | ISO 8601 | The effective date when this extension is considered to be revoked. Optionally, once revoked, an extension can only be reactivated by replacing it with entirely new extension data. |

A skilled person will appreciate that strict adherence to the structure and format of the extensions and how they are stored is not necessary. Alternative structures may be possible for the extensions and/or collections of permissions. Example alternatives could be that the extensions may not strictly be stored in an extensions map and could be stored in a list or other appropriate data structure. Extension objects as described herein alternatively may also have a different structure in that they merely comprise a list of permissions or a list of permission references and the permissions themselves are stored elsewhere on the permit.

During the lifetime of the permit, extensions may be used to add and replace permissions. Extensions may be added or revoked by the parent permit. Optionally, all permissions that are added to a permit are signed by the holder of the parent permit.

In an embodiment, extensions enable a permit holder to associate different devices with a permit. For example, if the permit is for access to a particular resource (optionally a computing resource), then a single permit holder might have an "iPhone" extension to manage their iPhone's interactions and a "desktop" extension to manage their desktop computer's interactions with the computing resource. As mentioned above, it is possible to revoke an extension. Advantageously, if the user were to lose their iPhone, they can contact their permit provider (which has control over the parent permit that created this user's permit) and they can revoke the iPhone extension without affecting the user's other devices' interactions with the service. Thus it can be seen that the extension system provides improved flexibility and control when it comes to providing/removing access to resources. Coupling this with the central control of the permits and/or lack of a Certificate Revocation List, computing resources can be saved when it comes to validating permissions within the relevant extensions by not requiring the distribution and maintenance of such a list.

Interactions with Permits

As discussed above, the permit system described herein is optionally interacted with using requests. Optionally, the requests are HTTP requests. More optionally, the requests are sent to REST endpoints. There are two relevant REST endpoints:

. . . /send to request operations on a permit including creation and revocation of children, and . . . /query to check a permit's validity and permissions.

Optionally, a number of the interactions will require a signature, thus an organisation wishing to interact with their permits for creation, revocation, or other interactions, will need to have a private/public key pair set up. Any requests will also need to comprise the instance id of the permit of interest. The instance id and the public key can be publicly viewable or knowable, however the private key must be kept secret.

Transmitting a request to these endpoints can also be described as "calling" them as they are presented as a RESTful API. Thus, the sender of the request can also be considered the "caller".

Optionally, any requests sent to the " . . . /send" endpoint are logged. Optionally the logging occurs on a blockchain such that a third party can audit the request. Optionally, any requests sent to the " . . . /query" endpoint are not logged.

In an embodiment, interactions are logged onto a blockchain or at least a subset of the interactions are logged onto a blockchain. Optionally, all of these interactions are logged off-chain and a subset of the interactions are logged onto the blockchain. Optionally, the interactions are logged into collections of interactions where each collection of interactions relates to a single permit. Each collection of interactions also has an associated representation (through the use of transactions) on the blockchain. Thus, an auditor wishing to track interactions with the permit of interest can audit only the collection of interest.

Optionally, each of the interactions logged onto the blockchain comprises an immutable reference of the previous interaction (optionally also stored on the blockchain). Optionally, the reference is a hash of the previous interaction. Optionally, all interactions comprise a reference to the previous interaction thus establishing an immutable chain of all interactions. Thus, the immutable log only requires a subset of the interactions to be recorded on the blockchain. Optionally, only the first and last interactions are recorded on the blockchain.

Optionally, the logging is conducted using an Event Stream for each permit. Optionally, there is a logging service interacted with through an API to provide the logging embodiments. The Event Streams are as described with reference to:

PCT/IB2021/051258 filed on 15 Feb. 2021 by nChain Holdings Limited,

PCT/IB2021/051260 filed on 15 Feb. 2021 by nChain Holdings Limited, and

PCT/IB2021/051333 filed on 17 Feb. 2021 by nChain Holdings Limited.

Optionally, data indicative of any interactions with the permit are transmitted to an Event Stream through use of an Event Stream API. Optionally, the Event Stream API is a RESTful API. The current state of the permit can be verified by taking all of the interactions (including its creation) with the permit and recreating a "dummy permit" by conducting/replaying all the interaction steps again (this could also be described as a "dry run" in that no new permits are actually created). The final state of the "dummy permit" should have the same current state as the real permit. The same is true for verifying any intermediate state of the permit if said intermediate state is known.

Thus, it can be seen that through logging the interactions with the permit, the state of the permit is logged and therefore the current or any previous state is auditable and verifiable. By submitting these state changes to the blockchain via Event Streams, the permit becomes auditable and verifiable permanently and with high confidence of data integrity.

Some example requests to an endpoint could comprise the following features in the header:

POST https://{AWS ID}.amazonaws.com/api/v1/processInstance/{instance ID}/send or POST https://{AWS ID}.amazonaws.com/api/v1/pro-
cessInstance/{instance ID}/query Where {AWS ID} is the id of an AWS (TM) endpoint and
{instance ID} is the permit identifier. A skilled person will
appreciate that other URLs and services may be used. For
example, non-AWS URLs may be used. A skilled person
will understand that requests provided herein are exemplary
and may take different forms. The requests are shown as
comprising the URL the request is being sent to. Optionally,
the complete URL is not provided in such a manner and
merely the path is provided.

Optionally the request header also comprises an AWS API
key.

Optionally the body of a POST should be a JSON
objection containing a single property named for the mes-
sage or interaction being sent. Optionally authentication and
authorisation for the request conducted by signing the
parameters with the sender's private key and placing the
result in the signature property of the request. For example:

```
{
    "createChild": {
        "permitContents": "<stringified JSON object>",
        "signature": "<base64 signature over permitContents>"
    }
}
```

Note that the part of the request being signed will need to
be sent as a string representation of the request contents and
not a JSON object itself. This is to ensure that both the
sender of the request and the receiver of the request use the
same representation of the object (irrelevant of spacing,
ordering, etc) for calculating the signature. Alternatively to
stringifying, a canonical structure of the object could also be
used. This canonical structure is optionally defined accord-
ing to RFC8785. The canonicalisation scheme is one that is
agreed upon by both the sender and receiver. The scheme
may be agreed upon beforehand, or the scheme is identified
by the sender such that the receiver understands which
scheme is being used. Optionally responses to the above
mentioned requests are provided with a result property and
an optional message. For example:

```
{
    "result": "ok",
    "msg": "Success! Permit created",
    ...
}
{
    "result": "error",
    "msg": "Invalid parameters",
    ...
}
```

The exact contents of the message (msg) will depend on
the context of the request and how it is processed.

Below there are presented a number of different embodi-
ments describing different interactions permits. Optionally
any number of these embodiments may be used with any
number of different other embodiments. A skilled person
will appreciate that some embodiments may not be used in
every conceivable system. For example, extensions may not
be used and therefore any interactions relating to creation or
revocation of extensions may not be used.

Each permit data structure can be stored in a permit data
store 180. The permit data store 180 is accessible by suitable API or other means from the payment processing resource
106. The permit data structure is stored in the permit data
store 180 in any suitable way so that the permit identifier can
be used to identify the permit. This enables the other
elements of the permit data structure to be accessed for
example, during checking of a cryptographic signature.

Figure 2:
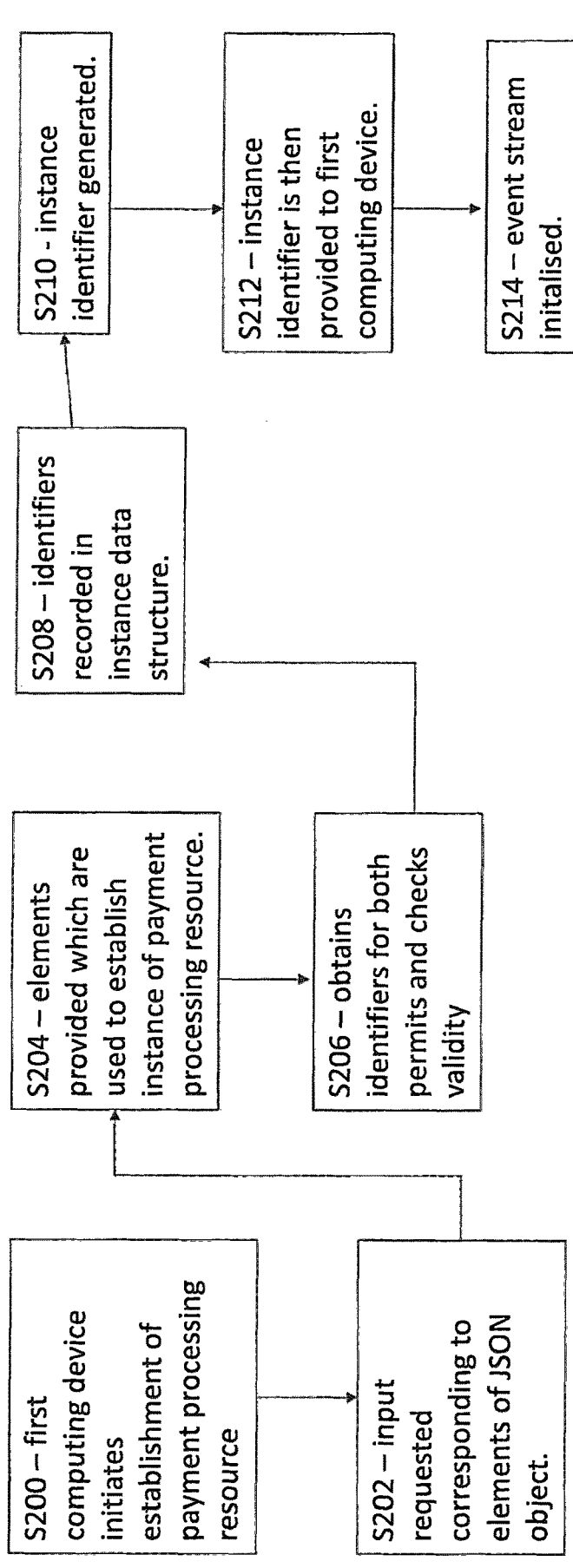
FIG. 2 illustrates the establishment of an instance of the payment processing resource in accordance with an embodiment.

The payment processing resource 106 enables a user to
establish an instance of the payment processing resource 106
which they can use to manage an account. This will now be
described with respect to FIG. 2. The instance of the
payment processing resource 106 is used to manage the
activity surrounding an asset which is managed by an
account which is established on the payment processing
resource 106 in accordance with the process set out in
GB2109064.2 filed on 24 Jun. 2021 in the name of nChain
Licensing AG.

The first computing device 102, which is associated with
the user, downloads application code which configures it to
generate application programming interface (API) calls
using API 108 which will be received by the payment
processing resource 106. The payment processing resource
106 provides a payment processing resource identifier to the
first computing device 102 which can be used by the API to
identify the payment processing resource 106. The identifier
may be an alphanumeric sequence of characters or it may be
a purely numeric sequence of characters.

The first computing device 102 initiates the process of
establishing an instance of the payment processing resource
106 by generating an API call to an endpoint of the API 108
which corresponds to a request for a new instance of the
payment processing resource 106. This is step S200. The
API call comprises the payment processing resource iden-
tifier provided by the payment processing resource 106 to
the first computing device 102.

The payment processing resource 106 may be associated
with a stringified JavaScript Object Notation (JSON) object
which may have elements which correspond to an identifier
for the asset which the corresponding account manages; an
identifier for the account manager, an identifier of the permit
data structure of the account manager, an identifier for the
account holder's permit data structure, an identifier for a
sponsor of the account (this may be a customer of the bank,
for instance), an expression to enable the expressions in the
account holder's permit to be checked and terms and con-
ditions (including a uniform resource location to enable the
terms and conditions to be retrieved, a hash of the terms and
conditions, a cryptographic signature of the account holder),
configuration parameters (e.g. minimum and maximum bal-
ance settings), settings for how numbers are controlled and
spending limits for the corresponding funding account.

The permit data structures for the account manager and
the account holder may be structured as described above
with various permissions provided which can be crypto-
graphically verified using the permit data structure by the
payment processing resource 106.

The payment processing resource 106 responds by
requesting data corresponding to the elements which are
used by the corresponding instance of the payment process-
ing resource 106. This is step S202.

The first computing device 102 then provides the respec-
tive elements which are used by the payment processing
resource 106 to establish the instance of the payment pro-
cessing resource 106 required by the corresponding user to
interact with the payment processing resource 106. This is
step S204.

In establishing an instance of the payment processing
resource 106, the payment processing resource 106 effectively generates a profile for the user which is identified by an instance identifier (the generation and use of which is described below). This means that when the payment processing resource 106 is accessed using the identifier, the payment processing resource 106 can determine which files to access and can also determine the correct allocation of resources (i.e. memory, directories and registers) to activity on that instance. The payment processing resource 106 can run, access and utilise each instance separately. Where the payment processing resource 106 is implemented through a cloud-based resource, the instance of the payment processing resource 106 may be implemented using corresponding software which run through the necessary hardware across the cloud infrastructure. This enables resources to be allocated appropriately to any one instance by the payment processing resource 106.

On receiving the respective elements, the payment processing resource 106 processes the required elements and validates the data provided in support of the account holders and account manager's permits. In doing so, it obtains the public keys corresponding to both permits. It also obtains identifiers for both permits and checks the validity of the expressions for both permits. This is step S206. This is by reference to permit data structures corresponding to the respective permits. The cryptographic signature on the terms and conditions is also checked by reference to the account holders permit data structure. This may be checked using the method set out above where the terms and conditions and the cryptographic signature are provided to the permit data store 180 with a request for the cryptographic signature to be verified against the corresponding permit data structure. The cryptographic signature is then verified using known techniques, e.g based on Elliptic Curve Digital Signature Algorithm (ECDSA) or Rivest-Shamir-Adleman (RSA) approaches to digital signature generation and verification. If the signature provided in the request is successfully verified, then it is accepted the digital signature is valid. If it is not then a rejection message can be issued.

The identifiers for the asset and the account manager are then recorded in an instance data structure 170 which is generated for the instance. Identifiers corresponding to the permits for the account holder and the account manager are also recorded in the instance data structure 170. This is step S208. The instance data structure 170 comprises any suitable data structure which is necessary for providing access to the identifiers for the account holder and the account manager. The instance data structure 170 may be accessed by the payment processing resource 106 using any suitable means, such as by additional API or by a data communications network.

The balance for the corresponding funding account is also set to zero and other settings relating to the representation of the numbers, spending limits and minimum and maximum balance are also set in the instance data structure 170. An instance identifier is also generated to identify the instance to the payment processing resource 106 when a message for that account is being received by a user. This is step S210. The instance identifier is then provided back to the first computing device 102 where it can be saved for further interaction with the payment processing resource 106. This is step S212. The instance identifier can also be used by other users if they need to interact with the corresponding instance of the payment processing resource 106. The provision of the instance identifier to the first computing device 102 completes the generation of the instance of the payment processing resource 106 corresponding to the funding account for the asset identified in the information provided in step S204. The provision of the instance identifier to the first computing device 102 also triggers the generation of the parameters required for the allocation of resources to the corresponding instance of the payment processing resource 106. On completion of the generation of the instance of the payment processing resource 106, the payment processing resource 106 interacts with the event stream manager 110 to initialise an event stream corresponding to the instance of the payment processing resource. This is step S214. The event stream will be used to record the full history associated with the corresponding funding account. Only read or append operations can be performed on the event stream.

The initialisation of an event stream may comprise the set-up and configuration of the computing resources and data structures which are required to implement the particular event stream. Alternatively or additionally, the completion of the generation of the instance of the payment processing resource 106 may result in accessing a pre-existing event stream. Accessing the pre-existing event stream may also comprise appending an entry to append data confirming the instance of the payment processing resource 106 has been established. The pre-existing event stream may be an event stream containing entries for all instances of the payment processing resource 106. The pre-existing event stream may also be an event stream which synchronises each of the other event streams into a single event stream which is also managed by the event stream manager 110. Additional details of the functionality of event streams may be found in GB2002285.1 filed in the name of nChain Holdings Limited, GB2020279.2 filed in the name of nChain Holdings Limited and PCT/IB2021/051261 filed in the name of nChain Holdings Limited.

The establishment of the instance of the payment processing resource 106 and the provision of the instance identifier enables a device such as first computing device 102 to interact with the instance of the payment processing resource 106. Other devices aside from first computing device 102 can also interact with the generated instance provided they are permitted to do so by a permit data structure, as will be described below.

In a first example of an interaction between a computing device and the instance of the payment processing resource 106, we describe below how first computing device 102 may utilise API 108 to initiate a session with the instance of the payment processing resource generated in steps S200 to S214. As will be described later, the session can then be used to enable other interactions with the instance.

Figure 3:
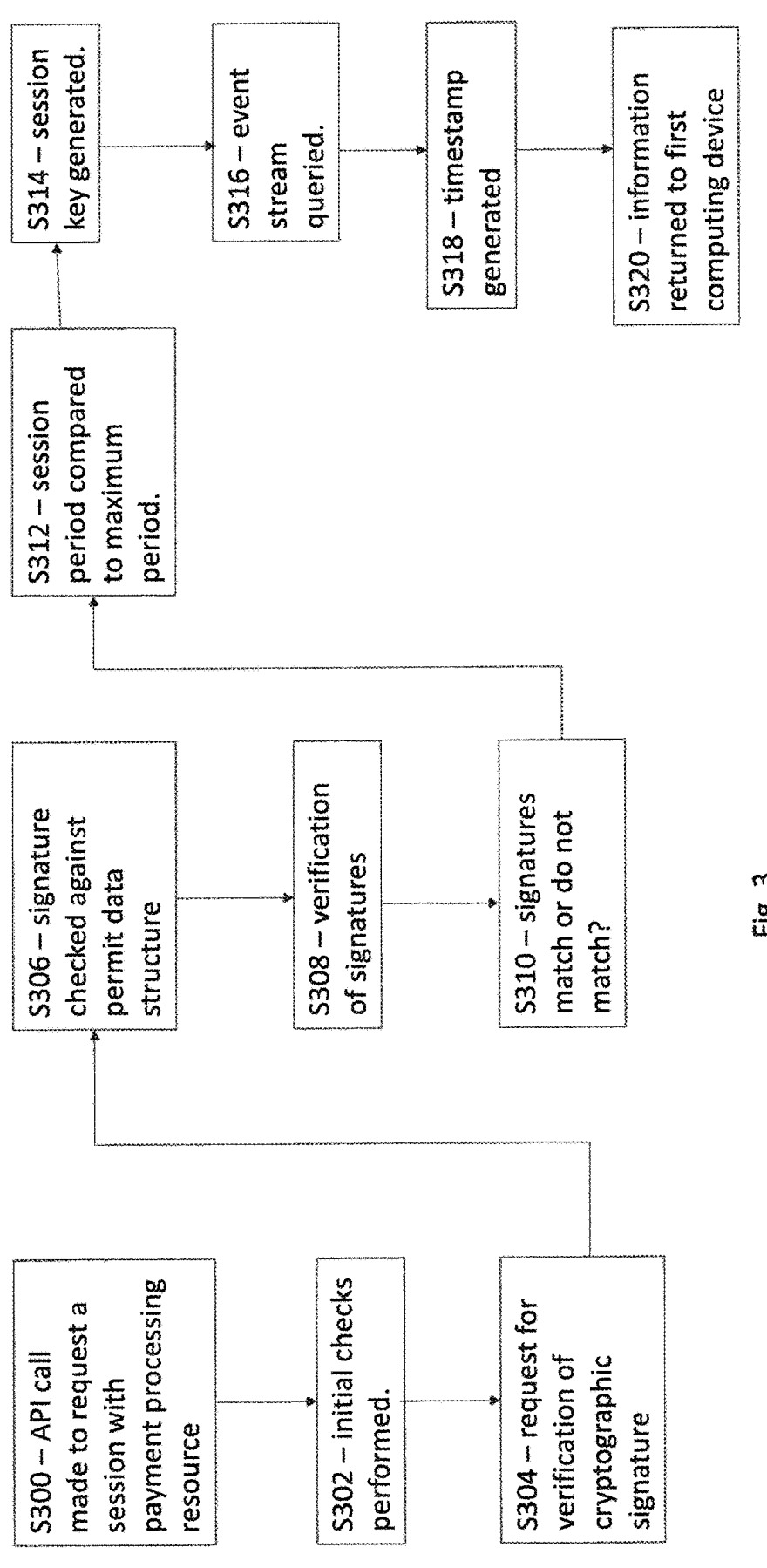
FIG. 3 is a flow chart illustrating how a computing device may interact to retrieve information from an event stream.

Specifically, we describe, with reference to FIG. 3, how the first computing device 102 may obtain a session key to enable interaction with the funding account associated with the instance of the payment processing resource 106.

In step S300, first computing device 102 issues a call using the API 108 to request a session with the instance of the payment processing resource 106. This utilises a session endpoint for the API 108. The API call to request a session passes the instance identifier (which is associated with the respective instance of the payment processing resource 106) to the session endpoint to initialise the session with the instance of the payment processing resource 106. The API call also contains instruction data which contains a timestamp which confirms the time at which the call was made. The instruction data may also comprise the period of time in which the session may be utilised (and inherently the period during which the corresponding session key will be used) and a flag confirming whether the instruction is coming from the account manager (set to false if the instruction is coming from the account holder).

The instruction data may also contain data including a permit identifier which identifies a permit data structure and a credential in the permit data structure which may show the authorisation of the first computing device 102 to access the event stream. The validation of such a credential is discussed later in the context of how to validate a data item. Such a credential may also be described as a permission in the permit data structure. The instruction data may also contain the public key corresponding to the permit data structure.

That is to say, the payment processing resource 106 determines, based on the API call and the provided instance identifier, that the message from the first computing device 102 relates to a request to establish a session between the first computing device 102 and the instance of the payment processing resource 106.

The instruction data also comprises a cryptographic signature from the account holder corresponding to the funding account associated with the identified instance of the payment processing resource 106. That is to say, the instruction data is cryptographically signed by the account holder and this is included with the instruction data. The cryptographic signature may be generated using elliptic curve digital signature algorithm (ECDSA) techniques using the private key associated with the account holders permit data structure. Alternatively the signature may be generated using RSA based techniques.

In response to the API call, the payment processing resource 106 performs some initial checks to determine whether a session key can be generated or whether the request should be immediately rejected. This is step S302. That is to say, the payment processing resource 106 checks the timestamp to see whether it is at most one minute from the present time. If the timestamp is more than one minute away from the present time, the request for a session is rejected. If the timestamp is less than or equal to a minute from the present time, the request for a session is admitted. The time period may not be one minute from the timestamp indicated time. For more security conscious applications the time period may be much shorter than a minute but for less security conscious applications it could be longer.

By checking the current time relative to the time indicated by the timestamp to determine how long it has been since the request was made, the payment processing resource 106 can prevent replay attacks.

The period of time (otherwise known as the session period) is also checked by the payment processing resource 106 to determine the time the session will likely be in use. The period of time is typically indicated in terms of seconds or minutes but could be indicated as a range of dates during which the session is expected to be in use.

In a step S304, the payment processing resource 106 issues a request to the permit data store 180 for the cryptographic signature (included in the instruction data) to be verified. This may be through a separate API or through a message transmitted to the permit data store 180 through a telecommunications network. Alternatively, the permit data store 180 may be local to the payment processing resource 108 in that it occupies the same localized group of hardware resources. The request will include the instruction data provided in step S300 and the cryptographic signature used to sign that instruction data (i.e. the one being verified). The request may also include a reference used by the specific instance of the payment processing resource 106 which is making the verification request and may also include a string which identifies the device which was the source of the request. For example, the string may be "iPhone" if the request was made from an Apple iPhone®. This string may be provided in the instruction data and extracted from the instruction data by the payment processing resource 106. The reference used by the specific instance may be an event stream index for the request made in step S300. This is advantageous in that it assists in verifying the state of the permit data structure in combination with the state of the associated event stream (i.e. the event stream generated for the instance of the payment processing resource 106) at the time the request was made. That is to say, it may help to validate the permit data structure produced the correct response given its current state when the request for the verification of the cryptographic signature was made. The request also comprises the instance identifier for the respective instance of the payment processing resource 106 and additionally comprises a permit identifier to enable the permit to be identified by the permit data store 180.

The permit data store 180 will then carry out a check on a record corresponding to the permit identified by the permit identifier. This is step S306. The check returns a confirmation if the cryptographic signature is found in the permit data structure corresponding to the permit. This involves verifying the signature using standard ECDSA or RSA signature verification techniques. The generated signature is compared to the cryptographic signature provided in the instruction data. This is step S308. The check returns a denial if the cryptographic signatures do not match. This is step S310 and the request fails or is no longer processed. If the flag confirming whether the instruction is coming from the account manager is set to true then the public key used to verify the signature is from a permit data structure owned by the account manager.

If the check returns a confirmation, i.e. that the signatures do match, then the session period requested in step S300 is compared by the payment processing resource 106 to a maximum period which is set by the payment processing resource 106 for sessions with the corresponding instance of the payment processing resource 106. This is step S312. If the session period is less than the maximum period set by the payment processing resource 106, the payment processing resource 106 will generate a session key (can also be referenced as a session token) for the requested session with the requested session period. This is step S314. The session key will be generated by the payment processing resource using any suitable technique. It may be generated using the public key which corresponds to the permit found in the permit data structure. The session key may be generated using hierarchical key generation techniques using the public key/private key pair associated with the account holders permit as a base key. The session key can they be returned to the first computing device 102 with a message that the session has been initialised. The session key can then be used with instruction data for further requests requesting interaction with the event stream. However, it can only be used for the session period which has been requested.

If the comparison in step S312 returns a result which indicates the session period is more than the maximum period or less than a minimum value also set by the instance of the payment processing resource for sessions with the payment processing resource 106, the payment processing resource 106 will not generate a session key and the request will fail, i.e. is no longer processed.

Alternatively or additionally, if the cryptographic signature is verified but the requested session period is less than a minimum value set for sessions with the instance of the payment processing resource 106, the payment processing resource 106 may generate the session key and increase the allowed session period to the minimum value.

On generation of the session key, the payment processing resource 106 may retrieve the balance from locally held storage. Optionally, the payment processing resource 106 may also issue a query to the event stream manager 110 for a sequential log of transactions from the event stream corresponding to the funding account associated with the instance of the payment processing resource identified by the instance identifier. The query may return a partial or full version of the event stream, providing an overview of the transaction history relating to the funding account associated with the instance of the payment processing resource 106. A partial version may be returned if the query specifies a range of dates where the event stream manager 110 will return all entries between those dates. The range of dates may be specified in the initial request made in step S300 or it may be automatically generated by the payment processing resource 106. This is step S316.

The event stream manager 110 will generate a timestamp for that query and the index of the event stream. This is step S318. An entry may be added to the event stream by the event stream manager 110 responsive to the query.

The balance (if obtained), the timestamp and the index of the event stream are then returned to first computing device 102. This is step S320. The session key can then also be transferred to the first computing device 102 in step S320.

The first computing device 102 can then use the session key to request read only data from the event stream associated with the instance of the payment processing resource identified by the instance identifier provided in step S300. This is without having to repeat the authentication process involved with generating the session key. That is to say, the session key may be provided in an API call from the first computing device 102 to the payment processing resource.

This may be part of a request to view the state of account that us tracked by the event stream or to obtain information regarding the history of said account. A request to obtain information regarding the history may request details of transactions specified by a range of dates, a range of indices or even a hash of the respective transaction data. A request may also be for the full transaction history.

That is to say, a computing device may interact with an instance of a payment processing resource 106 using an instance identifier and then obtain read-only information from the associated event stream. Alternatively, a computing device may interact with an instance of a payment processing resource 106 to generate a session key which can then be used in further interactions with the event stream. On making the request, the permit data structure corresponding to the supplied cryptographic signature is verified using the permit data structure and the request only proceeds if the cryptographic signature is verified. The use of the permit data structure to verify the cryptographic signature and to determine that the session period is neither too short nor too long acts as a protocol to determine the admissibility of the message and particularly the request to obtain read-only data in relation to the event stream associated with the instance of the payment processing resource. The user of the first computing device 102 can only access the read-only data if the session can be authorised and the session can only be authorised if the requirements of the protocol, i.e. the presence of the signature and the length of the session period, can be satisfied. The authorisation of the session comprises the provision of the session key to the requesting user. The user may sign the instruction data with the session key and the signature can be checked by the payment processing resource 106 when the user requests access to the corresponding event stream. The payment processing resource 106 may determine that the protocol described above is required based on the received API call from the first computing device in that it may provide a parameter identifying the type of request being made. Alternatively or additionally, if the first computing device 102 provides the request via a data communications network, the message may provide a parameter which identifies the specific type of request.

Figure 4A:
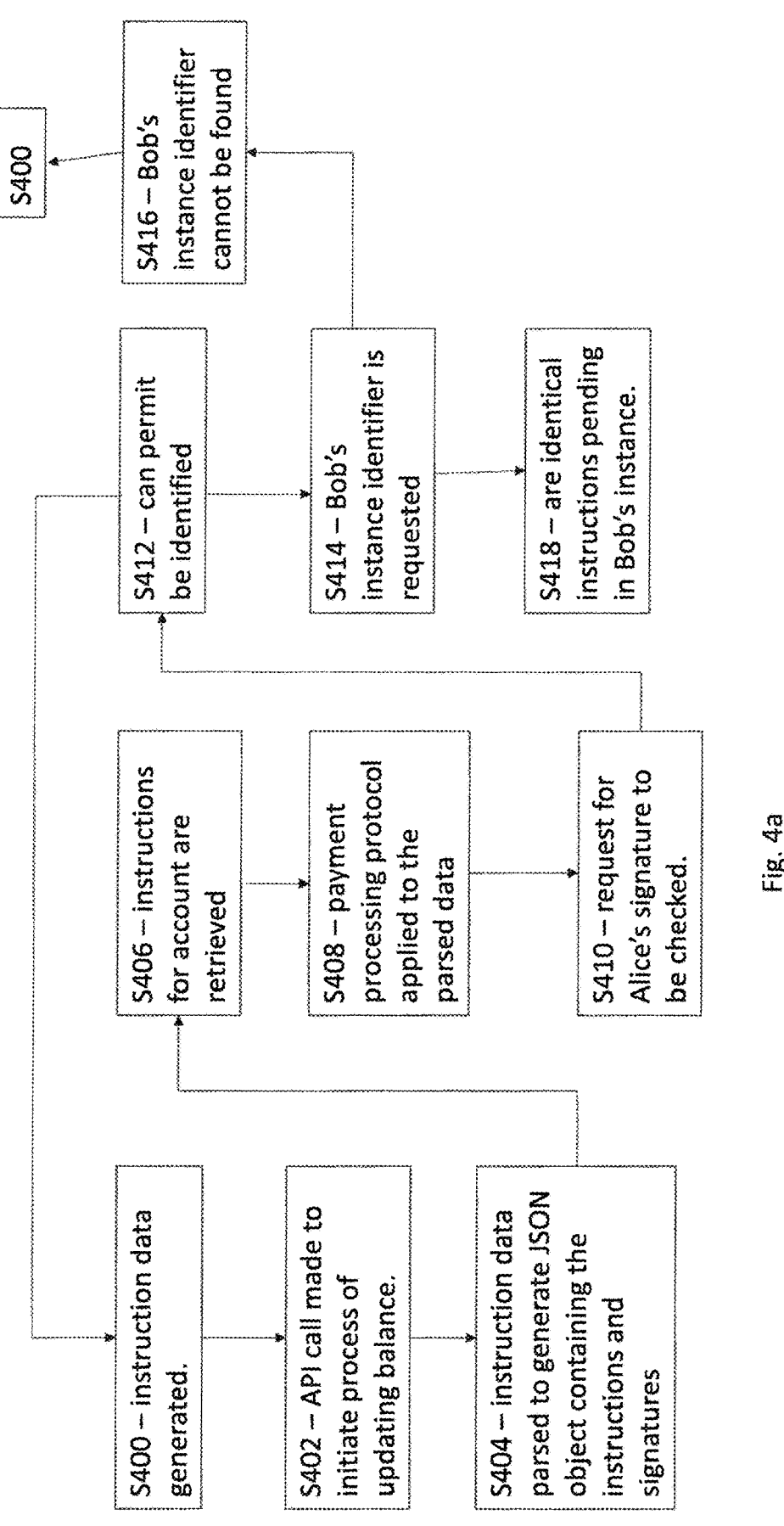
FIG. 4a and FIG. 4b are flow charts illustrating how a payment processing device may process a transaction.
Figure 4B:
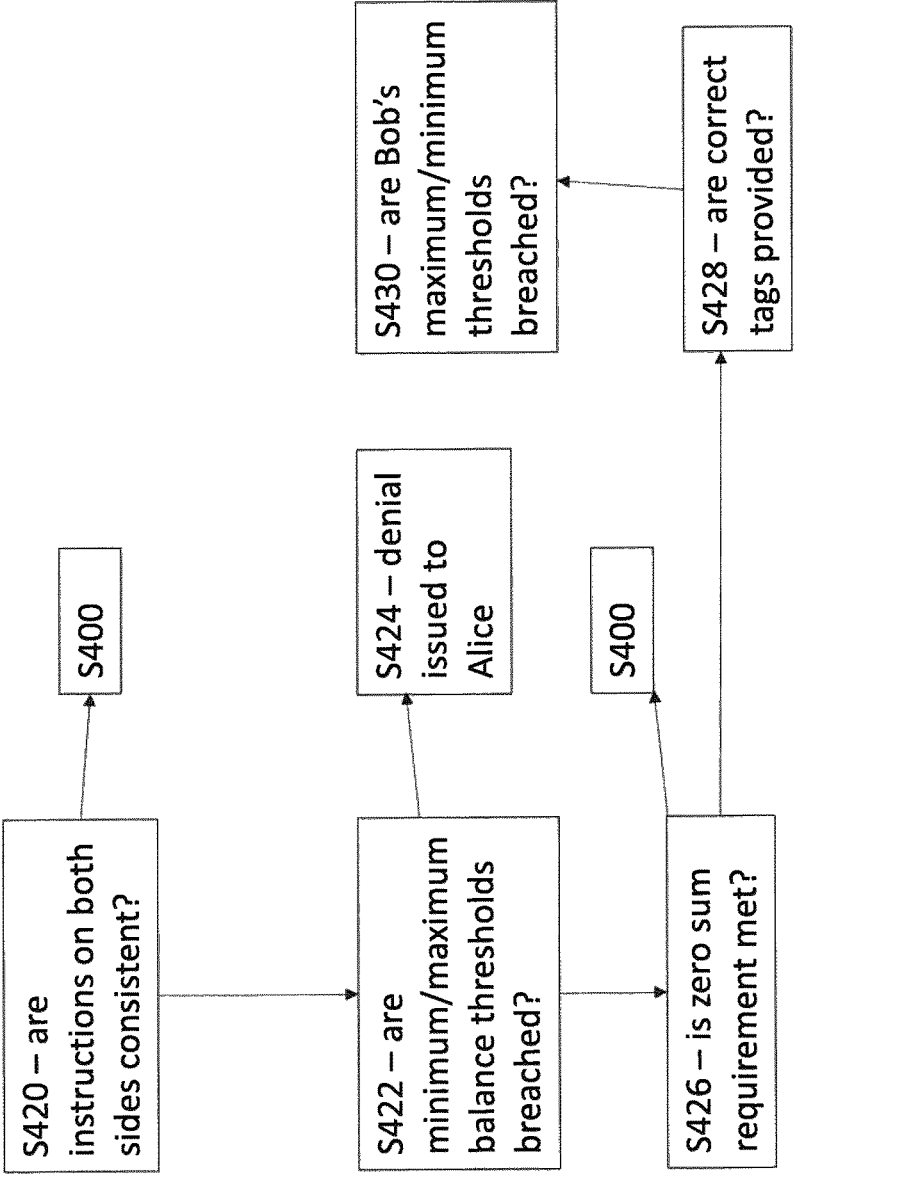

Now, in reference to FIG. 4a, we describe how a first computing device 102 may interact with an instance of the payment processing resource 106 during a transfer of funds from a funding account associated with one instance of a payment processing resource 106 to another instance of a payment processing resource 106. This leads to a transfer being recorded on associated event streams.

In a step S400, a payment processing management module 195 generates instruction data regarding a payment from Alice to Bob of 5 GBP. The instruction data is generated from payment metadata received from Alice (perhaps using first computing device 102 or second computing device 104) which indicates the amount Alice wishes to pay to Bob, the instance identifier for Alice's instance of the payment processing resource 106 (the instance corresponding to the funding account from which Bob is to be paid), the currency in which Alice wishes to pay (i.e. GBP), an identifier of Bob, and an identifier of the instance of the payment processing resource 106 associated with Bob's funding account, which for simplicity, is a GBP account managed by the same account manager as Alice. The generation of the instruction data comprises the combination of the payment metadata received from Alice and the information associated with Bob's funding account.

The payment processing management module 195 then makes an API call using API 108 for an update to Alice's balance which may also be understood as a request to debit Alice's funding account of 5 GBP and credit that amount to Bob's funding account. This is step S402. The API call receives the instruction data generated by the payment processing management module 195 as part of the call. In making the API call, the first computing device enables the payment processing resource 106 to receive the instruction data generated in step S400. The API call also includes additional data (also received by the payment processing resource 106) which may comprise a transaction identifier (which may be generated in the same step from a hash of the instruction data) and other information which may be used in the transaction (which may be referred to as a tag or tags). The tags will be included in the event stream entry when the transaction has been completed and the information regarding the transaction is added to the event stream. The tags may say, for example, "Debit Alice-5 GBP" and/or "Pay Bob 5 GBP". The API call also includes cryptographic signatures from Alice and Bob's account. The cryptographic signatures may be generated using ECDSA (or RSA) techniques using private keys corresponding to Alice and Bob's permit data structures.

The transaction identifier uniquely identifies the funds transfer and may be formed using an Secure Hash Algorithm (SHA) 256 hash of the instruction data. The tags may comprise information which will also be used in the event stream entry when the transaction is appended to the event stream. The tags may be formatted as an array of strings wherein each string comprises an alphanumeric string of characters.

That is to say, the payment processing resource 106 can determine, based on the API call and the identifier provided in the API call, that Alice at the first computing device 102 wants to enter into a transaction with Bob, i.e. that a transaction is to be processed.

In a step S404, the data received in the API call is parsed to generate a JSON object containing the instructions and the cryptographic signatures corresponding respectively to Alice and Bob's accounts. The instructions will identify (from Alice's account) the account manager, the identification of the asset (i.e. GBP), the value being transferred (i.e. 5 GBP), an identifier for the funding account (which may be distinct from the instance identifier), an alphanumeric string containing a reference for the transaction (i.e. payment to Bob), time-limits on the transfer of funds and a response data structure which will be discussed further below. The instructions will also identify (from Alice's account) the terms and conditions agreed to by Alice when her funding account was created, a cryptographic signature over the terms and conditions agreed to by Alice and a uniform resource locator for those terms and conditions.

The instructions will also identify (from Bob's account) the account manager, the identification of the asset (i.e. GBP), the value being received (i.e. 5 GBP), an identifier for Bob's funding account (which may be distinct from the corresponding instance identifier), an alphanumeric string containing a reference for the transaction (i.e. payment from Alice), a nonce for the transaction and a challenge data structure which will also be discussed further below. The instructions will also identify (from Bob's account) the terms and conditions agreed to by Bob (on creation of his funding account) and may also comprise a cryptographic signature over the terms and conditions agreed to by Bob and a uniform resource locator for those terms and conditions.

The payment processing resource 106, as a resource which orchestrates the transfer of funds between Alice and Bob, may dynamically manage the transfer of funds as we now describe in that it manages the credentials provided by both Alice and Bob and the interaction with the permit data structures and the event streams. This is without the need for storage of the instruction data.

Optionally, the instructions may be stored by Alice's instance of the payment processing resource 106 in storage for that instance as a pending transaction. The storage may be identified by the transaction identifier generated in step S402. The instructions may also be stored by Bob's instance of the payment processing resource 106 as a pending transaction in storage allocated for that instance.

The parsing of the data received in the API call also retrieves the instance identifier for the instance of the payment processing resource associated with Alice's funding account. That is then used in a step S406 to retrieve instruction data associated with Alice's funding account. These instructions form the constraints for the funding account and the limits on the transactions which can be completed using the funding account.

The instruction data associated with Alice's funding account may comprise an identifier for the account manager, an identifier for the asset being transferred (i.e. GBP), the maximum value which can be transferred, the instance identifier for the instance of the payment processing resource associated with Alice's funding account, a sequence number for the transaction being processed, a nonce for the transaction being processed, fields corresponding to the time period in which the transaction may be completed (i.e. a minimum date and time and a maximum date and time), a reference for the transaction, a tracking identifier for the transaction, an alphanumeric string indicating the action to be taken (i.e. debit of 5 GBP), an identifier for the party (i.e. account holder) and the tags.

The instruction data associated with Alice's funding account may also comprise a response data structure, the use of which we will now describe.

That is to say, Alice's funding account is represented as a JSON object which requires input corresponding to each of the stated fields and that input is provided by the parsed data.

The processing of the parsed data then enables the payment to be processed by the payment processing resource 106 using the response data structure and the challenge data structure. The parsed data is then passed to the payment protocol module 120 for processing of the requested payment. The payment processing resource 106 may be able to determine that the payment protocol module 120 is required and the payment processing protocol is required based on a parameter provided in the initial API call. Alternatively, the specific protocol may be identified in the instruction data. Alternatively, the specific protocol may be identified by a parameter in a request transmitted over a data communications network.

The payment protocol module 120 applies a payment processing protocol to the parsed data to determine whether Alice has permission to make the payment and whether the payment can be made irrespective of authorisation from Alice's permit data structure. This is step S408.

The first step in the application of the payment processing protocol is to determine whether the instructions are properly authorised. This is achieved by determining whether the instructions came from the account holder or the account manager. In this example, the instructions have come from Alice and so it is the account holder who is providing the authorisation. This can be verified using the instance data structure 170 where the instance identifier corresponding to Alice's instance of the payment processing resource 106 is stored. The payment processing protocol then determines the validity of Alice's signature. This is carried out using Alice's permit data structure. The payment protocol module 120 issues a request to the permit data store 180 for the validity of Alice's signature to be checked. This is step S410. The request identifies the permit using a permit identifier provided by Alice in the instruction data. The permit identifier may also be obtained from a permit store which is maintained by the payment processing resource 106. This request receives the instruction data, a string comprising Alice's signature, a reference containing the current event stream index for the event stream associated with Alice's funding account and the name of the device used by Alice to provide the instruction data (this may be contained in the payment metadata used to generate the instruction data and passed in the generation of the instruction data).

On receiving the request, the permit data store 180 identifies the permit corresponding to the permit identifier and determines whether or not Alice's provided signature corresponds to the cryptographic signature associated with Alice's permit data structure. This is step S412. This check returns a yes or no answer.

If it returns a no answer, the process fails with a message provided to Alice that the transaction cannot proceed. If it returns a yes answer, then the payment protocol module 120 can move to the next step of the payment processing protocol.

The payment processing module 120 then issues a request for Bob's instance identifier, i.e. the identifier used to identify Bob's instance of the payment processing resource 106, from the instance data structure 170 This is step S414. This is to check the counterparty (i.e. Bob) is genuine.

If the instance data structure 170 cannot provide Bob's instance identifier, then it returns a denial message. This is step S416. This leads to a denial being issued to Alice that her transaction cannot proceed due to an invalid counterparty account being identified in the instruction data. The process fails and the request is not processed further.

If the instance data structure 170 can provide Bob's instance identifier, the payment processing module 120 proceeds to the next step of the payment processing protocol.

Then in step S418, a third instance of the payment processing module 120, an instance responsible for the successful processing of the transaction, confirms that the instructions provided by Alice and Bob are complementary i That is to say, the payment processing resource confirms that the instruction data corresponding to both sides of the transaction complement each other, one is paying the other or, in other words, one is sending funds and one is receiving them. This is step S420.

Responsive to a negative determination, i.e. that the instructions from Bob's side are not corresponding, Bob's instance of the payment processing resource 106 provides a denial message. This is then converted by the payment processing resource 106 into a rejection of the transaction which is transmitted to Alice. The process then fails and the request is not processed further.

If Bob's instance of the payment processing resource 106 is providing complementary instructions then the payment processing module 120 proceeds to the next step of the payment processing protocol where the transaction data is processed to determine whether minimum and maximum balance thresholds are not breached. This is step S422. At this stage a check may take place to see if the account on either side has been frozen.

If it is determined that either of the thresholds have been breached and/or that an account has been frozen, the payment processing resource 106 issues a denial to Alice that the transaction cannot be completed. This is step S424.

If it is determined that the thresholds have not been breached and/or that no freeze order is in place, the payment processing module 120 proceeds to the next step of the payment processing protocol 120 where it is determined whether the zero-sum requirement of the transaction is met. This is step S426.

In order to determine whether the zero-sum requirement has been met, the value element in the instruction data for Alice and Bob is checked. In this example, Alice is paying Bob 5 GBP and so the value on Alice's side should read-5 GBP (which it does) and the value on Bob's side should read 5 GBP (which it does). This is because 5 GBP is being debited from Alice's account and 5 GBP is being credited to Bob's account. This means the zero-sum requirement is met. If the value field on Bob's side read 4.90 then there would be 0.10 unaccounted for and the zero-sum requirement would not be met. As the zero-sum requirement has been met then the payment processing module 120 can proceed to the next step. In the event the zero-sum requirement is not met the transaction is rejected and the process moves back to step S400.

If the zero-sum requirement is met then the payment processing module 120 may then choose to determine whether tags are provided in the instruction data which are correct for the particular job that is being performed. That is to say, does the tags in the instruction data from Alice say "Debit 5 GBP and Credit Bob 5 GBP". This is step S428. If it is the account manager who has signed the instruction data then the tags will be processed to determine the presence of other tags. For example, if the account manager is a bank and the transaction involves a currency exchange, appropriate tags should be included. The tags which are included in the instruction data and generally included in the data which is appended to the event stream to log the transaction. For this reason it is important they are accurate.

The payment processing module 120 may also issue a request to Bob's instance of the payment processing resource 106 to determine whether minimum or maximum balance threshold's are being breached in respect of Bob's instance. This is step S430. If Bob was the party paying Alice then a maximum payment threshold would also be checked.

Proceeding through the steps applied by the payment processing module 120 applies a payment processing protocol to the instruction data, i.e. the request, provided by Alice. The remaining step to determine whether the transaction can be completed is to determine, based on the permit data structure, whether Alice has the credentials required to pay the money to Bob from the account she is paying from.

Figure 5A:
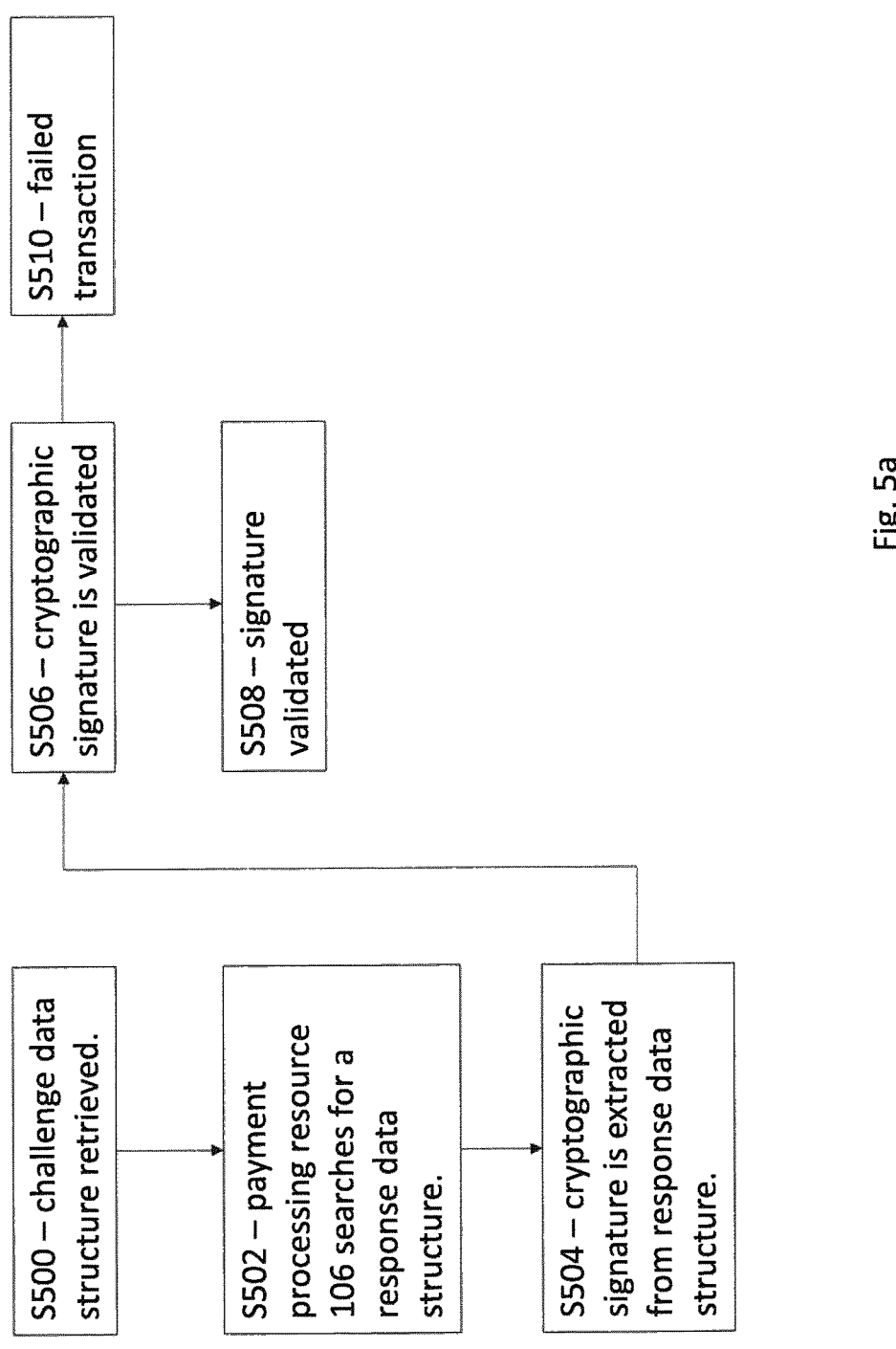
FIG. 5a and FIG. 5b are flow charts illustrating how a challenge data structure and a response data structure may be used to validate a data item.
Figure 5B:
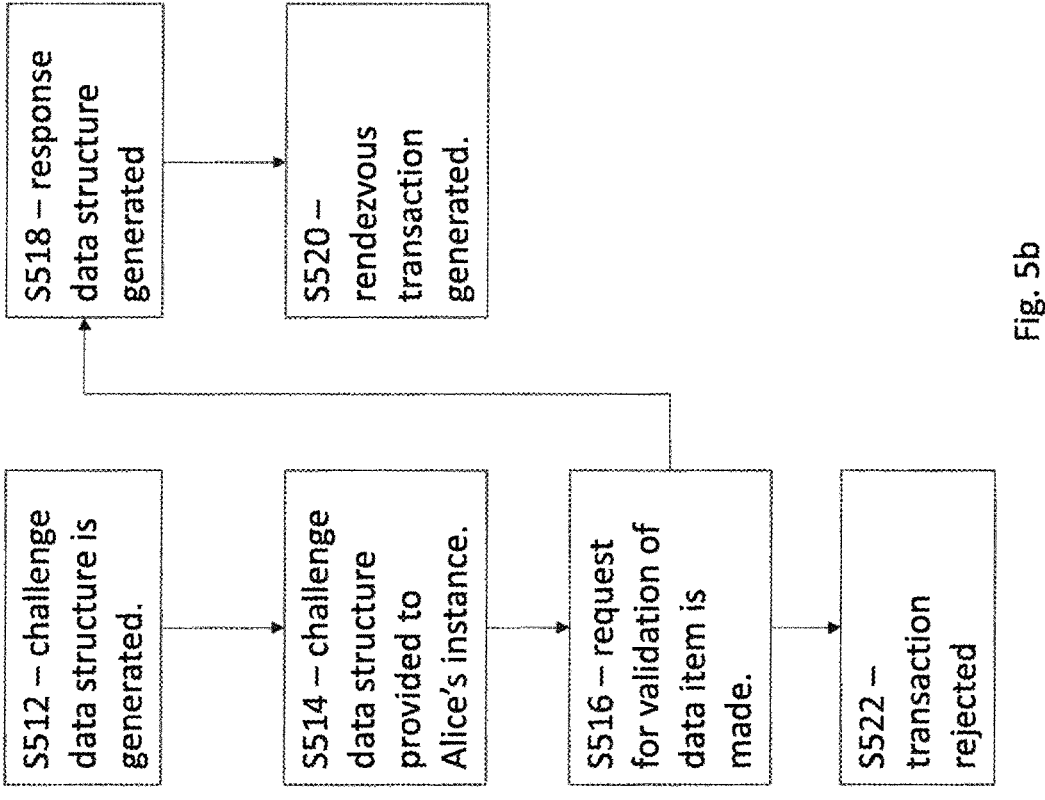

We will now describe how the challenge and response data structures are used to validate the Alice's credentials in declaring that she can make this payment from the referenced funding account. This is with reference to FIG. 5a and FIG. 5b.

The challenge data structure is provided by Bob and it is provided by Bob's instance to request that Alice can show she is allowed to enter into the transaction. Bob's instance of the payment processing resource 106 generates the challenge data structure when it receives the instruction data regarding the payment from Alice to Bob. The challenge data structure comprises an identifier for the challenge data structure. The identifier for the challenge data structure may be an alphanumeric or a numeric sequence. It may be randomly or pseudo-randomly generated. The challenge data structure also comprises a nonce for the data item to be validated. The nonce for the data item will be combined with a nonce provided in the response data structure and this will form the basis of a cryptographic signature provided by Alice's instance of the payment processing resource 106 when the data item is validated (as will be described below). The challenge data structure also comprises a data item which is being validated. The data item may be have a reverse DNS domain-like structure (i.e. com.example.user.id). The data item may be a namespaced alphanumeric sequence of characters. The data item may alternatively be any alphanumeric sequence of characters. It may be an expression which can be understood by a human being or it may be just a randomly generated collection of characters. The data item represents the claim that Alice is making that she can make the payment. That is to say, the data item represents a credential that Alice is declaring in instructing the payment processing resource 106 to process the payment to Bob. The data item may be an expression as described above with respect to the permit data structure.

The response data structure is provided by Alice in her instructions associated with her instance of the payment processing resource 106. The response data structure may be generated by Alice's instance of the payment processing resource 106 when the instructions to pay Bob are received. The response data structure comprises an identifier for the response data structure. It may be an alphanumeric or a numeric sequence. It may be randomly or pseudo-randomly generated. The response data structure also comprises a nonce. The response data structure further comprises an identifier for the corresponding permit data structure owned by Alice. The response data structure may further comprise an identifier which identifies the device used by Alice.

The response data structure further comprises a cryptographic signature of a SHA256 hash of a concatenation of the nonce provided in the response data structure and the nonce provided in the challenge data structure. The cryptographic signature may be generated based on a private key corresponding to a public key owned by Alice, i.e. the public key corresponding to the permit data structure identified in the response data structure. The cryptographic signature may also be generated using a paired (with the public key) private key found in a digital wallet associated with Alice. The steps leading to the generation of the response data structure are now described.

The payment processing resource 106, in step S500, retrieves the challenge data structure provided by Bob. In a step S502, the payment processing resource 106 searches for the response data structure using the identifier for the challenge data structure. The identifier for the response data structure should match the identifier for the challenge data structure.

In this example, the response data structure is provided by Alice in step S400 as part of her instruction data and it is a response data structure which satisfies the challenge data structure to demonstrate ownership of a permit data structure (as we now set out). We will later describe how the payment processing resource 106 proceeds if no response data structure is provided initially and needs to be requested. That is to say, the payment processing resource 106 finds the response data structure with the corresponding identifier in what is already provided by Alice. This may occur where the responder (i.e. Alice) already knows which permit data structure the challenger (i.e. Bob) would be seeking as support for the validation of Alice's authority to make the payment. That is, the responder already knows of which data item Bob will seek validation from her permit data structure and can generate the nonces and signatures accordingly based on the corresponding permit data structure in the permit data store 180. The nonce in the response data structure would be generated in step S400 when Alice provides the instruction data. The nonce in the challenge data structure would be generated when the payment from Alice to Bob is agreed between the respective parties. The payment processing management module 195 may then generate the cryptographic signature of the concatenation of the nonces which is then provided in the response data structure included in the instruction data provided by Alice. The concatenation may comprise the nonce from the response data structure followed by the nonce from the challenge data structure.

Then, in step S504, the payment processing resource 106 extracts from the response data structure the cryptographic signature of the concatenation of the nonces. This signature is verified in a step S506 using known techniques for signature verification such as PKI. The payment processing resource 106 then moves to step S508 where it validates the cryptographic signature of the SHA256 hash of the concatenation of the first and second nonces. If the validation shows that the signature is not valid then the payment processing resource 106 provides a failed transaction message to Alice and Bob with the message that Alice could not enter into the transaction. This is step S510.

It is possible that the instruction data associated with Alice and Bob do not provide the respective response and challenge data structures or, as in step S510, the respective response and challenge data structures do not enable the authorisation of Alice to pay Bob 5 GBP to be validated. We will now describe, with reference to FIG. 5b, how Bob's instance of the payment processing resource 106 may check that Alice can enter into the payment if the response data structure provided in the instruction data either does not provide a valid signature or is not provided altogether.

In a step S512, Bob's instance of the payment processing resource 106 will generate a challenge data structure (if it has not already been generated or provided in the instruction data set).

The challenge data structure will contain a data item to be validated in order to process the transaction paying 5 GBP to Bob (from Alice). The data item may be an alphanumeric sequence which says something like "uk.co.Alice-Bank-Account". Alternatively or additionally it may be a purely numeric sequence like "31415192". The challenge data structure also contains a nonce. The nonce may be randomly generated based on the data item or it may be randomly generated independently of the data item. An identifier is also assigned to the challenge data structure.

The challenge data structure is then provided to Alice's instance of the payment processing resource 106 in step S514. Alice's instance of the payment processing resource 106 is then configured to determine, from the pending instruction data set, whether a response data structure has already been provided (which it has not for the purposes of this example) and then, if it does not, issue a query to the permit data store 180 (using the identifier of Alice's permit data structure) for a corresponding permit data structure (i.e. one owned by Alice) which contains the alphanumeric sequence "uk.co.Alice-Bank-Account" and which is valid at the time the request is made. This validation step is performed in step S516. The validation step, in summary, looks to determine whether the expression "uk.co.Alice-Bank-Account" is associated with the corresponding permit data structure, i.e. it is found in the permissions associated with Alice's permit data structure.

That is to say, the permit data store 180 is queried to determine whether Alice's instance of the payment processing resource 106 is cryptographically associated with a permit data structure containing the alphanumeric sequence "uk.co.Alice-Bank-Account" and whether the corresponding permit data structure is still valid.

The existence of a valid permit data structure containing the alphanumeric sequence "uk.co.Alice-Bank-Account" ensures that Alice has been through a specified KYC process (by her account manager) and is permitted by the account manager to enter into this transaction.

The query issued in step S516 takes the alphanumeric sequence as a parameter. It may also, optionally, receive further parameters in that the query may also carry: a flag for the type of alphanumeric sequence being provided; the index of the event stream associated with Alice's instance of the payment processing resource (in order to validate the index of the last entry on the event stream associated with the instance of the payment processing resource when the query (issued in step S516) was made); an extension which indicates the name of the device that Alice uses (or has used in the past) to provide instruction to the payment processing resource 106.

If the permit data store does return a permit data structure owned by Alice, i.e, one which can be identified with the identifier for Alice's permit data structure and where the permissions (i.e. the permissionSet) associated with Alice's permit data structure contains the alphanumeric sequence "uk.co.Alice-Bank-Account" then, in a step S518, the payment processing resource 106 will generate a response data structure which contains the identifier for the challenge data structure, the nonce provided in the challenge data structure, the identifier of the permit which is owned by Alice and contains the alphanumeric sequence, the extension indicating the name of the device Alice uses and a cryptographic signature of an SHA256 hash of a concatenation of the nonce provided in the challenge data structure with another copy of the nonce provided in the challenge data structure. The cryptographic signature may be generated by Alice using her private key, i.e. the private key corresponding to the public key identified in the permit data structure The cryptographic signature may also be generated using a private key associated with Alice which is found in a digital wallet associated with Alice. The transaction can then proceed as Alice's authorisation to make the payment has been validated. This is step S520. The payment processing resource 106 then proceeds with the next step of the transaction as is described below with regard to the generation of a rendezvous blockchain transaction.

If the permit data store does not return a permit data structure owned by Alice and which contains the alphanumeric sequence "uk.co.Alice-Bank-Account" the payment processing resource 106 then proceeds to reject the transaction. This is step S522.

The steps S512 to S522 may be repeated until the permit data store returns a permit data structure owned by Alice which contains one of the provided alphanumeric sequences (from the challenge data structure) in the event that a plurality of alphanumeric sequences are provided in the challenge data structure.

Alternatively or additionally, in the event that a response data structure is provided in the instruction data set provided by Alice, then for each provided alphanumeric sequence from the challenge data structure, the payment processing resource 106 may check the signatures are correct and the corresponding permits exist.

That is to say, for each alphanumeric sequence from the challenge data structure, the payment processing resource 106 forms a concatenation of the respective nonces from the response data structure and the challenge data structure. The payment processing resource 106 then queries the permit data store for a permit data structure by providing the concatenation and the cryptographic signature from the response data structure provided by Alice. The payment processing resource also provides the permit identifier from the response data structure to identify the permit where the corresponding signature should be found. The query may also provide a parameter containing the index of the event stream associated with Alice's instance of the payment processing resource 106 when the query is made. The query may also contain an indicator of the device Alice is using at the time the transaction is being processed.

In order to validate the cryptographic signature, the public key which is stored in the retrieved permit data structure is used to construct a signature in order to check it returns the same signature over the provided combination of nonces. If it does then the cryptographic signature provided in the response data structure is accepted as valid. If it does not then the response data structure is denied as not providing the authorisation to enter into the transaction.

Figure 6:
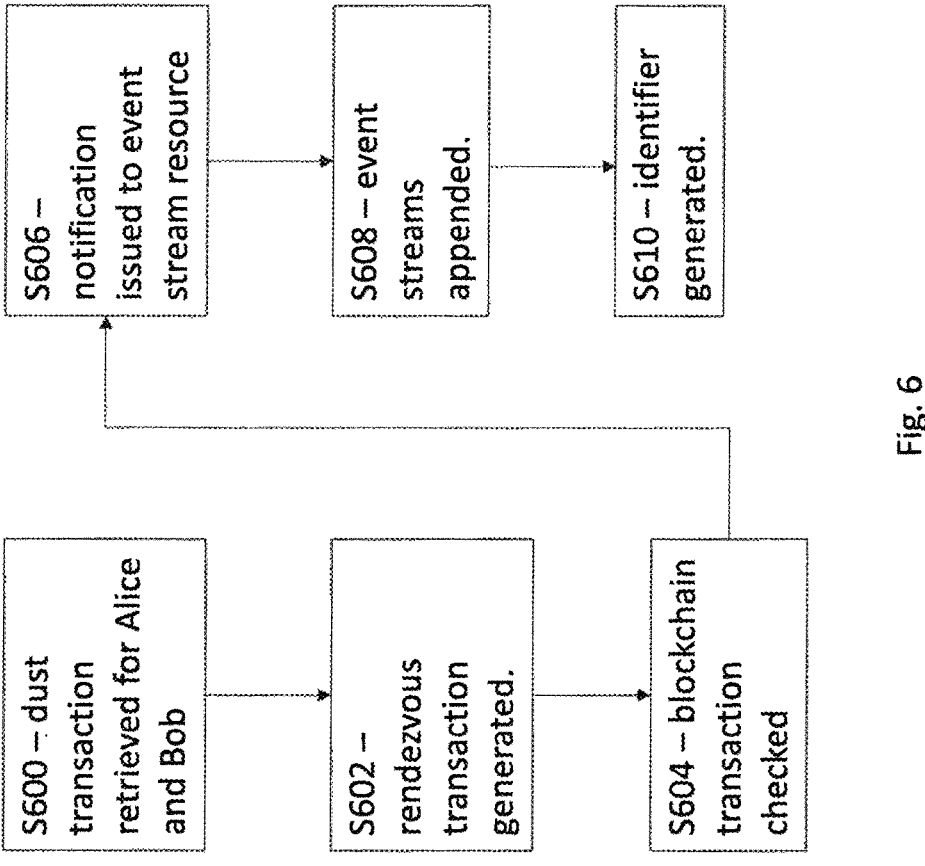
FIG. 6 is a flow chart illustrating how an event stream is appended with data relating to a transaction.

Responsive to the cryptographic signature being determined to be valid, the payment processing resource provides a request for the respective alphanumeric sequence corresponding to the cryptographic signature to be validated. This comprises providing a request to the permit data store for the respective alphanumeric sequence to be validated. This comprises providing the permit identifier (of the identified permit) to the permit data store with a request for a permit data structure identified by the permit identifier to be returned and, on return of the permit data structure, for a check to be made that the corresponding alphanumeric sequence is found in the identified permit data structure. If it is found in the identified permit structure then Alice's authorisation to enter into the payment is accepted. If it is not found in the identified permit structure then Alice's authorisation to enter into the payment is denied. The payment processing resource 106 can then proceed with the transaction with the generation of a rendezvous blockchain transaction which will be described with reference to FIG. 6.

A rendezvous transaction is a blockchain transaction which may comprise a plurality of dust chain input/output pairs and an output marked with an OP_RETURN opcode to make the output non-spendable and to enable the addition of a data carrier. An OP_RETURN opcode causes the immediate end of the execution of the corresponding redeem script and makes it invalid, i.e. the output cannot be redeemed. This means the output cannot be spent and the data carrier remains on the blockchain as part of the rendezvous transaction. The dust chain input/output pair may have the same index in the transaction and may respectively proceed the input funds and the change output. The data carrier may be the final output. The plurality of dust chain inputs which form the rendezvous transaction may be from different respective event streams.

In a step S600, the payment processing resource 106 then issues a request to the event stream management resource 110 for a rendezvous blockchain transaction to be established based on respective event streams associated with each of Alice and Bob (and HSBC as their account manager). This is described with reference to the illustrative schematic in FIG. 7. That is to say, in respect of Alice, the event stream management resource 110 is requested to access the current state of Alice's account. (and similarly for Bob's event stream). Chains of dust and their relationship to event streams are described below with reference to FIGS. 8 and 9.

The retrieved blockchain transaction 702 for Alice comprises a dust output (Tx0, Alice) and the blockchain transaction 704 for Bob comprises a dust output (Tx0, Bob).

Figure 7:
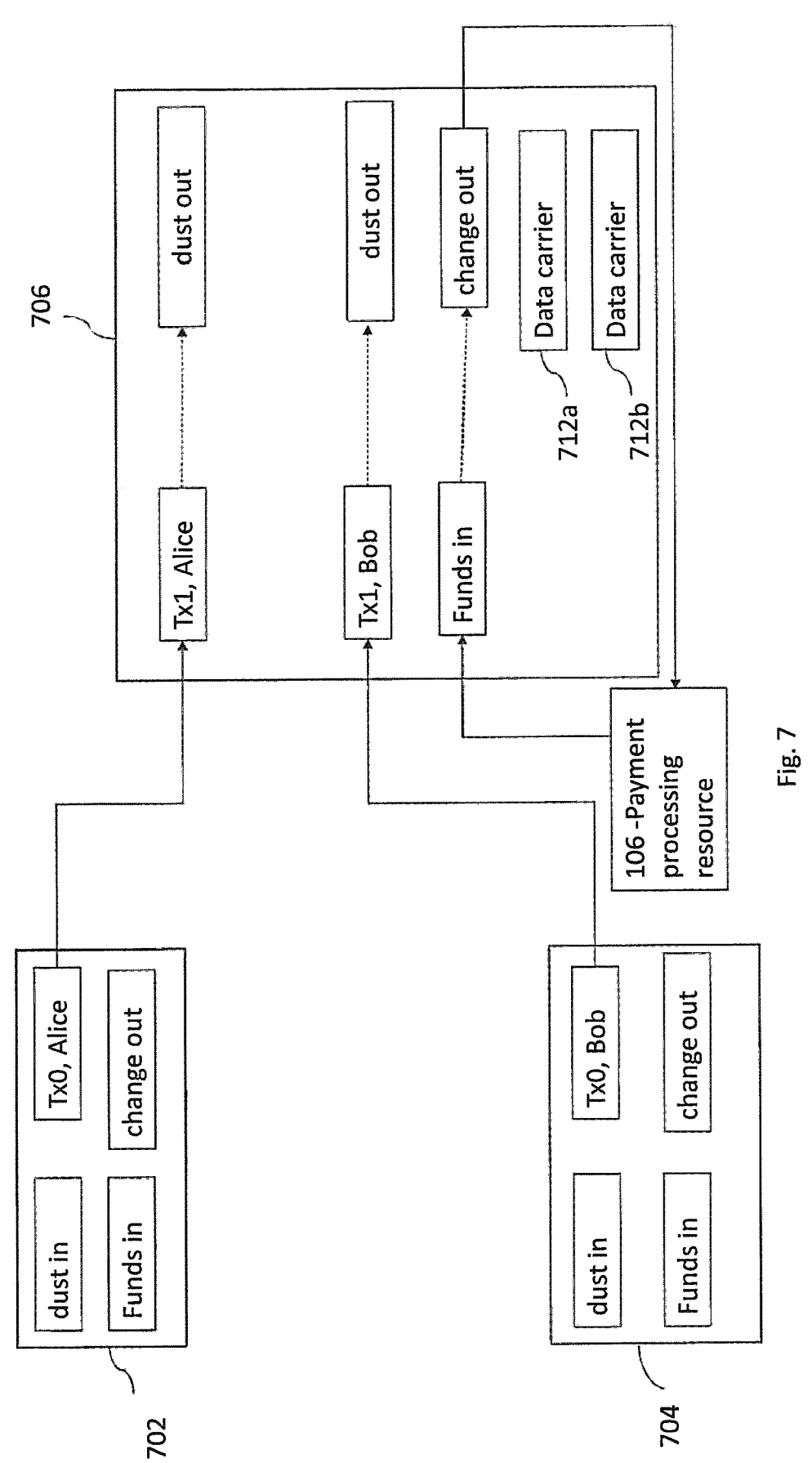
FIG. 7 illustrates a rendezvous transaction.

The payment processing resource 106 then generates a new rendezvous blockchain transaction 406 comprising a dust input for each of Alice and Bob which spends the respective dust outputs from the blockchain transactions retrieved in step S600. This is step S602. The dust outputs may be retrieved from a dust chain corresponding to event streams associated with Alice and Bob. This is also illustrated in FIG. 7. The chain of transactions between 702 and 704 into 706 can be described as a chain of dust transactions and one will exist for each of Alice and Bob corresponding to their respective event streams. A dust input/output is an input/output for an amount of cryptocurrency which is denoted to be "dust" by the field of cryptocurrency. The "dust" in the context of blockchain transaction for the present disclosure is understood to be a spendable transaction for a digital asset or cryptocurrency that has an output of low or minuscule value, i.e. the value may be much less that fees for mining the output in the blockchain. That is to say, the new rendezvous transaction synchronises the event streams in the name of Alice and Bob by generating a transaction which will underpin entries appended to both event streams.

Alternatively, the payment processing resource 106 may generate a new dust transaction using a combination of dust which does not form part of a pre-existing event stream and a hierarchical deterministic (HD) key chain as described in UK patent application no. 2102217.3. In other words, a dust transaction is generated which uses dust as an input and comprises inputs corresponding to each of Alice and Bob, wherein that dust has not been previously used in an event stream. A party in possession of the HD key chain may use one of the sub-keys and the dust to generate the first transaction in the new event stream. In short, a new event stream may be initiated based on dust which can be retrieved from an existing transaction on blockchain 112 and used as the base for the start of the new event stream. That is to say, the dust may be used to generate the transaction (in order to start the new event stream) and then returned to the platform before being used in the initiation of another event stream.

Figure 8:
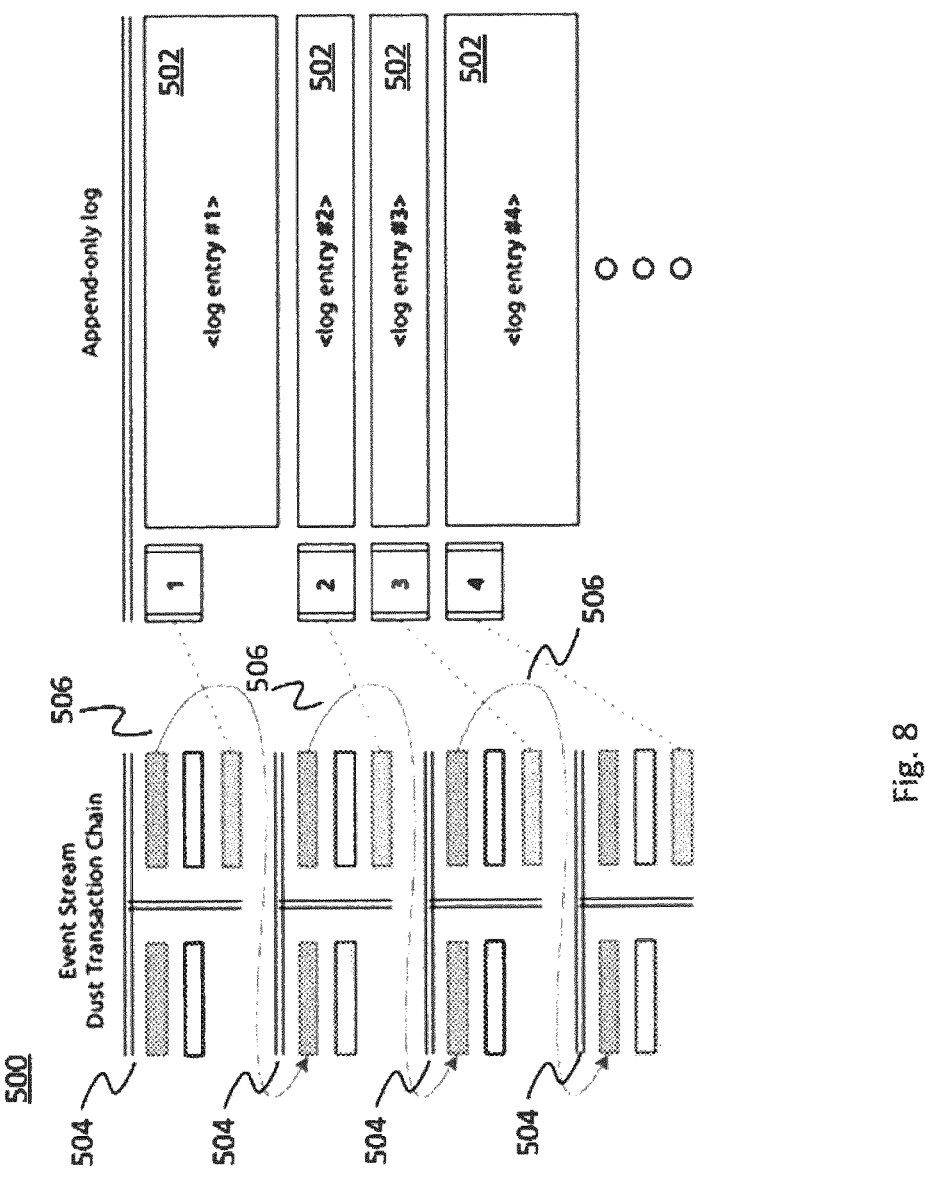
FIG. 8 illustrates a chain of dust.
Figure 9:
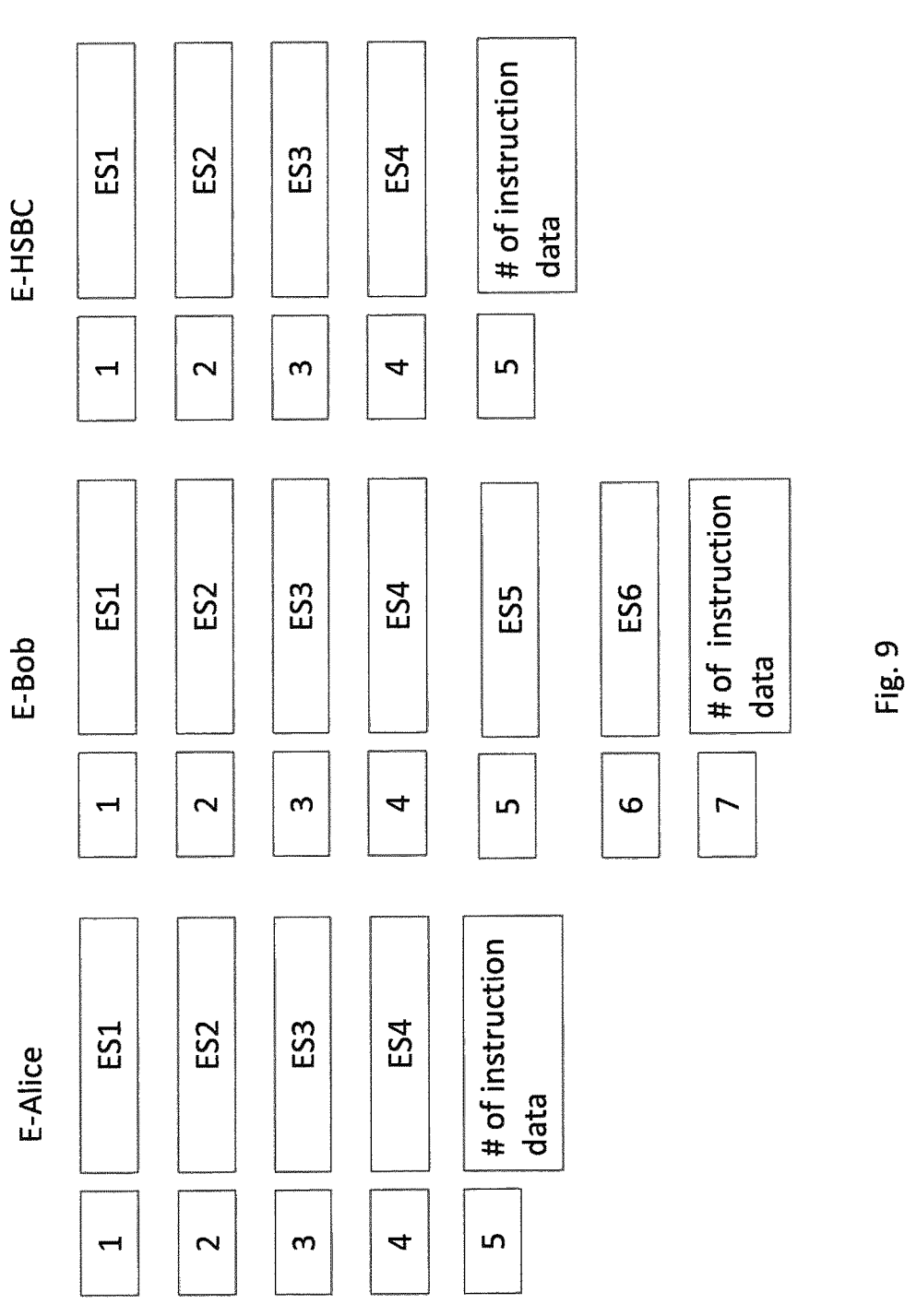
FIG. 9 illustrates event streams for parties to a transaction.

The relationship between chains of dust transactions and an event stream is further now elucidated with reference to FIG. 8.

FIG. 8 illustrates the basic data structure and paradigm of an ordered, append-only data storage system. This can also be described as a data logging system. The particular system shown in FIG. 8 is an Event Stream system for logging events. By way of example, the Event Stream is used throughout for illustrative purposes, however a skilled person will appreciate that the proposed systems and aspects described herein may be used with data records generally and with ordered, append-only data item logging or storage systems. The data record refers to a hash of actual data. The hash may be a hash of instruction data for a transaction which is being logged in the event stream corresponding to instances of the payment processing resource 106 associated with the parties. The use of a hash instead of the data itself advantageously provides a proof of existence for the data without requiring the data (which may large, even too large for a transaction) to be stored on a transaction. This also preserves the privacy of the data as the data will be indiscernible from the hash even if the hash is published on chain. The data described here is the payment instruction data related to the payment which is being recorded by the payment processing resource 106.

Each event 502 in the append-only log is mapped to a blockchain transaction 504, and the sequence of blockchain transactions are ordered and linked 506 using a 'chain of dust'. The data associated with each event is stored in a payload (described below) as a part of each transaction. The data payload (i.e. the hash of the payment instruction metadata) is held in an un-spendable OP_RETURN output of the transaction—an example of such a transaction is rendezvous transaction 706 as described above. This is a Script opcode which can be used to write arbitrary data on blockchain and also to mark a transaction output as invalid. As another example, OP_RETURN is an opcode of the Script language for creating an un-spendable output of a transaction that can store data such as metadata within the transaction, and thereby record the metadata immutably on the blockchain.

A chain of dust (or a dust chain) is an unbroken chain of cryptocurrency inputs and outputs, which are used here to impose a spending dependency of each blockchain transaction in the sequence on its immediate predecessor.

The use of dust outputs in the transactions is advantageous and key for maintaining an immutable sequential record of all transactions as they occur for an ordered, append-only data storage system, such as an Event Stream. This is because, although by posting transactions to the blockchain all blockchain transactions would be time-stamped and remain in a particular order once they are confirmed on or added to the blockchain, this does not guarantee preservation of their sequential order. This is because transactions might be mined into blocks at different times and/or the transactions are in a different order even within the same block. The use of dust outputs that are spent by the first input of the next transaction in the sequence advantageously ensures that the order of the transaction is chronologically tracked and a tamper-proof record of both the events themselves and the sequential ordering of the events is created. This is because once mined into a block, the payment of dust from a previous transaction to a next one in the sequence ensures that, in alignment with Bitcoin protocol rules, the sequence of embedded data carrier elements, called payloads and discussed below, cannot be reordered, and no insertions or deletions may occur, which could change it without it being immediately obvious that the event stream has been compromised. In some embodiments, a double spend prevention mechanism inherent to the Bitcoin protocol ensures that the movement of cryptocurrency (e.g. dust) between different transaction inputs and outputs remains in chronological order. The chaining of dust transactions takes advantage of the topological ordering to provide inter and intra block transaction (and therefore associated events and data) order preservation. Thus, this improves the integrity of ordered, append only data item storage.

In this manner, the blockchain transactions 504 form a directed graph of transactions. It should be noted that the direction of the graph can be considered as one-way, directed from the previous transaction in the sequence to the next, as indicated by the edges 806. While the arrows on edges 506 in FIG. 8 indicate a transaction pointing to the next, the spending relationship in a Bitcoin transaction is actually from one transaction to the preceding. This graph is created by the spending relationship between transactions. These spending relationships can be considered as a type of reference. Further details about how to append an event to an event stream can be found in UK Patent Application No. 2102314.8 and particularly, but not exclusively, where it refers to "Ordered, Append-only data Storage", "Event Stream and the Chain of Dust" and "Backward Referencing in the Chain of Dust"

A rendezvous blockchain transaction, such as transaction 706 illustrated in FIG. 7, is a blockchain transaction for synchronising a plurality of event streams, each associated with a given entity/user mentioned above. This is achieved by by spending multiple dust outputs as corresponding inputs. In this example this allows a chain of dust (i.e. a dust input/output pair) corresponding to each of Alice, Bob to pass through a single transaction. Dust chain input/output pairs must have corresponding input/output indices in the transaction. In this instance dust chain input/output pairs are used, as you will read below, to enable payments to be recorded in all event streams associated with the transaction.

The dust input which spends the dust output for Alice is denoted as Tx1, Alice and the dust input which spends the dust output for Bob is denoted as Tx1, Bob. The new rendezvous blockchain 706 transaction is generated in step S602.

The funds into the rendezvous blockchain transaction 706 are added by the payment processing resource 106 and will be paid back to the payment processing resource 106. This may be minus any miners fees following validation of the rendezvous blockchain transaction 706 if it is sent to the blockchain 112 for validation.

The rendezvous blockchain transaction 706 comprises further dust outputs which respectively spend Tx1, Alice and Tx1, Bob. As it is a rendezvous transaction, the indexes of the input/output pairs corresponding respectively to Alice and Bob are identical in that, for example, the input index of Tx1, Alice may be assigned as number 1 and the output index of the corresponding dust output is assigned as output index number 1.

The payment processing resource 106 also adds a provably unspendable output to the blockchain transaction 706 for each of Alice and Bob in the form of a data carriers 712a and 712b.

Each of the data carriers may hold a distinct dataDigest and/or a distinct streamDigest, wherein the streamDigest may also be salted.

The data payload held inside the respective data carrier (i.e. the hash of the payment instruction metadata) is held in an un-spendable OP_RETURN output of the transaction which means the data payload can then be stored in the blockchain as an unspendable output.

The data inside the data carrier 712 comprises a hash of the instruction data generated by the payment processing resource 195. This is generated in step S334. The provably unspendable output enables the rendezvous transaction 706 to carry the hash of the payment instruction dataset in the transaction and enables the hash to be stored on the blockchain. This means that the payment instruction dataset and, thus, a record of the payment is stored on the blockchain. This means that the record of the payment benefits from the immutability of the blockchain.

The blockchain transaction 706 may then be checked to see if the user's corresponding to the transaction is correct and correspond to the users, i.e. Alice and Bob. This is step S604.

The payment processing resource 106 issues a notification to the event stream resource 110 confirming the blockchain transaction 706 generated in step S602 can be used as the basis for appending data to the event streams, i.e. the event streams in respect of Alice and Bob.

An event stream is a blockchain-supported append-only log. In this example, Alice and Bob, each have their own event stream but, if they do not, an event stream may be initialised. That is to say, Alice has an event stream (E-Alice) and Bob has an event stream (E-Bob). Entries in the event stream may be denoted as ESn where n may be a non-zero positive integer or a non-negative integer.

As illustrated in FIG. 8, event streams can be illustrated as a series of entries where any entry in the stream may be referred to by a monotonically incrementing sequence number, i.e. the first entry may be referred to as ES1, the second entry may be referred to as ES2.

The payment processing resource 106 only appends to a respective event stream if Alice and Bob are authorised to access or append the event stream. The authorisation may be checked, for example, by comparing the cryptographic signatures used to sign the instruction data with stored signatures at the payment processing resource 106. By appending the payment data to the event stream, the payment can be recorded and benefit from being recorded on an immutable log which is associated with the blockchain 112. In short, the event stream is used to track the order of transactions from the accounts associated with Alice and Bob. That is to say, the entries in the event stream are an immutable log associated with the blockchain 112. Event streams as described above ensure:

Individual entries in the event stream have not been modified since they were written;

No entries have been inserted between previously contiguous entries;

No entries have been removed;

No entries have been re-ordered;

Unauthorised parties may not append events to a stream.

The payment processing resource 106 uses the rendezvous transaction 706 to synchronise the payment with the event streams E-Alice and E-Bob by appending an entry to each of those event streams containing the hash of the payment instruction metadata contained in the data carrier in blockchain transaction 706. This is step S608. This is illustrated schematically in FIG. 9. The account manager, for example, HSBC, may also have an event stream E-HSBC, which is also appended with a hash of the instruction data.

The payment processing resource 706 then generates an identifier for the entry added to each of the event streams. This is step S610. The identifier may be alphanumeric or it may be a number which is generated based on the hash of the instruction data. For example, if the hash of the instruction data is generated by a SHA256 cipher, the identifier may be generated by applying a further SHA256 cipher to the hash of the instruction data. That is to say, the identifier may be a hash of the hash of the instruction data.

The payment processing resource 106 then stores the identifier alongside a copy of the instruction data in the payment data store 124. This enables verification of the payment between Alice and Bob on request. The payment processing resource 106 also stores the cryptographic signature used to sign the instruction data alongside the identifier.

The payment processing resource 106 also maintains, in association with the payment data store 124, a log of all of the sets of instruction data which are stored on the event stream associated with the event streams which are associated with each instance of the payment processing resource 106. This can be used to prevent duplicated transactions from being appended to an event stream.

That is to say, the payment from Alice to Bob is processed following a message transmitted to the payment processing resource 106 which then determines, using a permit data structure and payment processing protocol, whether the payment can made and what the response should be, i.e. should the transaction proceed or not.

Figure 10:
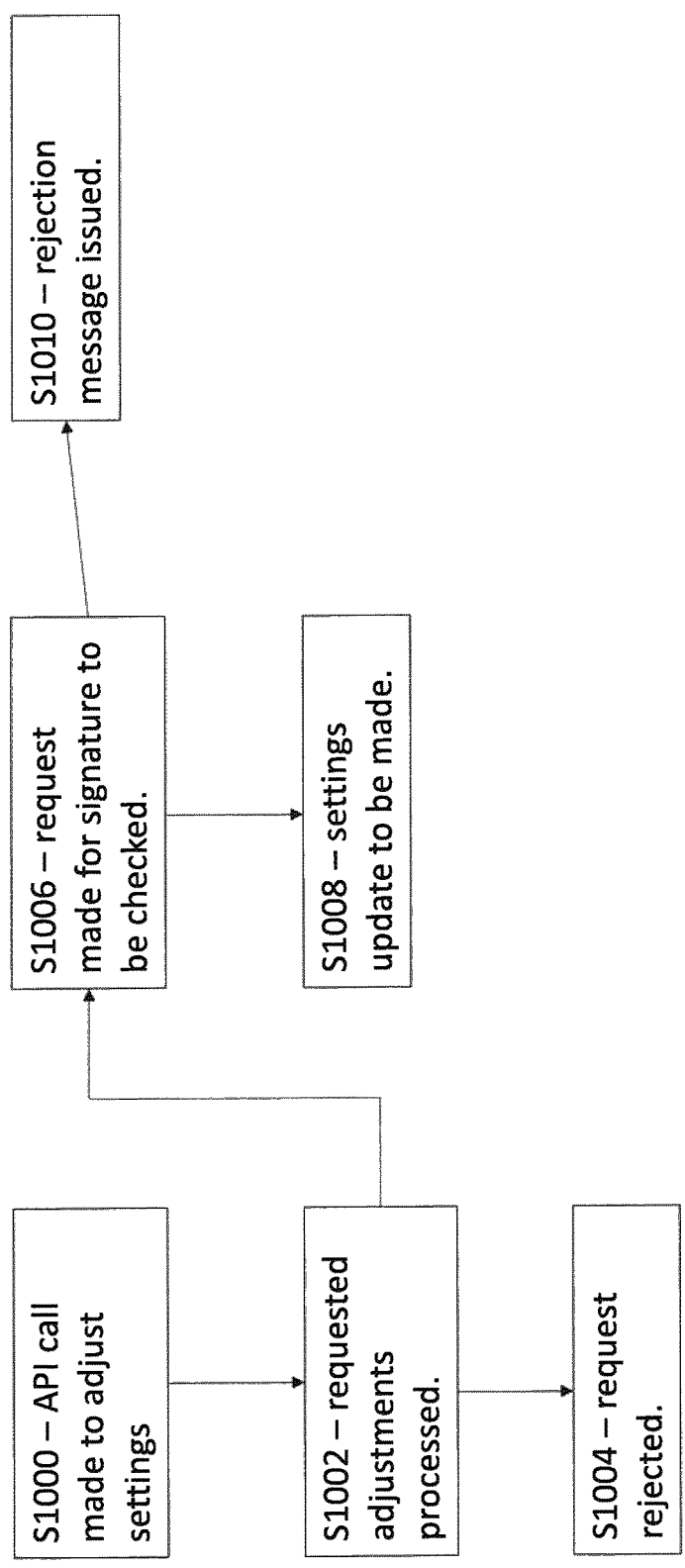
FIG. 10 is a flow chart illustrating how settings of an instance of the payment processing resource can be adjusted.

We now describe, with reference to FIG. 10, how the settings of an instance of a payment processing resource 106 can be adjusted.

In order to alter the settings corresponding to an instance of a payment processing resource 106, a first computing device 102 provides a call to API 108 which identifies the instance identifier for the respective instance of the payment processing resource 106 to which the settings adjustment pertains. This is step S1000. Based on this API call and the instance identifier, the payment processing resource 106 can determine that a request to change the settings is being made and that an adjusted settings protocol needs to be applied.

The request also comprises an instruction data set which comprises a timestamp corresponding to the time the request is provided through API 108, an extension which identifies the particular computing device corresponding to the first computing device 102, a requested adjustment to the maximum balance (if it is being adjusted), a requested adjustment to the minimum balance (if it is being adjusted), a freeze amount to indicate an amount of currency in the funding account to be held (if it is being adjusted), the instance identifier for the account to be frozen (if it is being frozen), a field corresponding to the legal basis for the freezing order, labels for the instance of the payment processing resource 106 (if an adjustment is being made), the number of decimal points the account uses to provide balance updates (if it is being adjusted), the spending limit for the funding account associated with the instance of the payment processing resource 106 (if it is being adjusted) and a cryptographic signature provided by the account holder.

The adjusted settings provided in the request are processed in step S1002 to determine whether the settings adjustments are correct (i.e. do not contravene the requirements of the payment processing resource 106). A setting adjustment may be incorrect if the data is invalid, for example. One example may be a timestamp which is a negative number, for instance. Another example may be an incorrect instance identifier for the account to be frozen, i.e. one which does not match the instance identifier for the account identified in the request. Another example may be a minimum balance which is larger than the maximum balance. If the settings adjustments are not correct then the payment processing resource 106 will issue a failed request message to the first computing device. This is step S1004. In a request containing multiple adjustments, the payment processing resource 106 may be configured to reject the request for all of the adjustments if one of them is found to be incorrect.

If the settings adjustments are correct then the payment processing resource 106 will proceed to checking the cryptographic signature provided in the request. This is step S1006.

The instance identifier is stored in the instance data structure 170 alongside a corresponding permit identifier for a permit data structure corresponding to the instance of the payment processing resource 106. The payment processing resource 106 retrieves the permit identifier from the instance data structure 170. The payment processing resource 106 then issues a request to the permit data store 180 to check the cryptographic signature provided in the request in step S1000.

This will involve providing the data in the request, i.e. the data over which the cryptographic signature has been used, and the cryptographic signature so that the cryptographic signature can be verified using a suitable technique. If the cryptographic signature provided in the request is the same as the cryptographic signature generated by the public key then the request for the settings adjustment can proceed in a step S1008 and a response is then generated to confirm the settings are updated. The change to the settings can then be recorded in the event stream corresponding to the instance of the payment processing resource 106. A hash of the instruction data can be generated and included in an event stream and this may be included in a response to the first computing device 102 confirming the change of settings. If the compared signatures are not the same then a rejection message is issued to the first computing device 102 in a step S1010.

The process described in relation to FIG. 10 can be used to change the settings on an instance of the payment processing resource 106. The determination of the correctness of the settings changes and the checking of the signature may form the adjusted settings protocol. This can be used to change maximum and minimum balances but can also be used to freeze or unfreeze the account. On receipt of the request to make the change in the settings, the permit data structure is checked to see that the signature is correct. If it is correct then the adjustment can be made. If it is not correct then the adjustment cannot be made.

In some cases, it may be possible for the account manager to generate the settings change and to provide the call described in step S1000. In that case, the account manager may have their permit data structure checked to ensure the permit data structure provides the entitlement to make the change.

Figure 11:
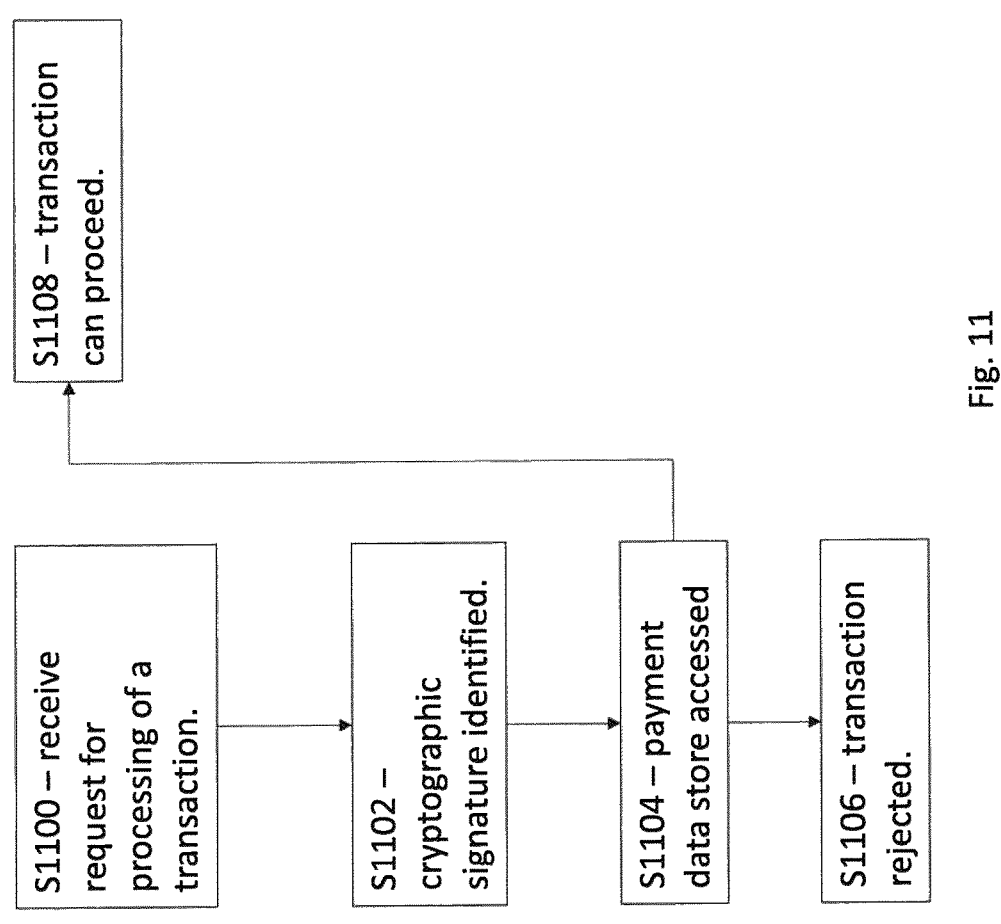
FIG. 11 is a flow chart illustrating how duplicated transactions are prevented.

We will now describe how the cryptographic signatures used to sign instruction data may be used to prevent duplicate transactions from being processed and duplicate entries from being added to associated event streams. This is described with reference to FIG. 11. Whilst this is described with respect to a single instance of a payment processing resource 106, it will be appreciated that this can be applied to every instance of a payment processing resource 106 which is involved in a transaction.

In step S1100, the payment processing resource 106 receives a request to process a transaction. The request comprises instruction data as described above in step S400. The request identifies a instance of the payment processing resource 106, the parsing of the instruction data (in step S404) may identify other parties to the transaction (i.e. Bob) and thus identify the other instances which are involved in the processing of the transaction.

In step S1102, the payment processing resource 106 identifies the cryptographic signature used to cryptographically sign the instruction data by the debitor (Alice in the example above). Alternatively, the payment processing resource 106 may identity the signature of another party to the transaction, such as the creditor.

In step S1104, the payment processing resource 106 accesses the payment data store 124 to determine whether the cryptographic signature is already recorded in the payment data store 124, i.e. as a transaction which has already been made and which will be on the event stream(s) associated with the parties involved in the transaction. The payment data store 124 may sort the transactions by any suitable value such as, for example, date of the transaction, the cryptographic signature used to sign the instruction data or any other suitable value.

If the cryptographic signature is already present in the payment data store 124, it is highly likely the transaction has already been processed and a rejection message is provided in a step S1106. In some embodiments, the log in the payment data store 124 may only be checked for a predefined time period such as the previous 30 days, say or the check may only be limited to the most recent 100 entries.

If the cryptographic signature is not already present in the payment data store 124, it is highly likely the transaction has not already been processed and the transaction proceeds to the steps outlined in steps S406 to S428 and steps S500 to S520.

That is to say, the payment processing resource 106 may determine that a transaction has been likely processed previously. Duplicate transactions, i.e. the same instructions at the same time, are undesirable to both account holder and account managers and need to be prevented.

It is possible that Alice and Bob (to use the earlier example) may both submit the instruction data at the same time which would generate a response of proceed for Alice and a denial for Bob. The payment processing resource 106, in this case, may then respond by re-processing after a specified time period, say 100-300 milliseconds, to allow corresponding event streams to be properly updated and so the determination as to whether there is a duplicate can be made again.

It should be noted that the above-mentioned aspects and embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of providing access to an asset transfer processing platform, the method implemented by a processing resource, the method comprising:

receiving a message from a client device associated with a user, the message comprising:

at least one identifier of a message type associated with the message;

at least one identifier associated with a profile registered on the asset transfer processing platform, wherein the profile relates to at least one event stream provided by the asset transfer processing platform, wherein the at least one event stream is associated with at least one asset type; and request data related to a request associated with the message and the profile;

determining, from the received message, the message type associated with the message and the profile registered on the asset transfer processing platform;

identifying, based on the determined message type, a message response protocol for the determined message type;

identifying a permit data structure for the profile, wherein the permit data structure provides at least a criterion defining which users can interact with the profile using the determined message type;

processing the request data to determine a presence of a cryptographic signature used to sign the request data and, based on the determination of the presence of a cryptographic signature used to sign the request data, further processing the request data to extract data items from the request data;

applying the identified message response protocol to the extracted data items;

generating a response to the message based on the message response protocol, the extracted data items and the permit data structure by:

determining, using the permit data structure, whether the user is permitted to interact with the profile using the identified message type;

determining, using the message response protocol, whether the extracted data items meet requirements of the determined message type; and based on the requirements of the determined message type being met, generating response content by interacting with the at least one event stream associated with the profile.

2. The computer-implemented method of claim 1, the method further comprising providing the response content to the client device.

3. The computer-implemented method of claim 1, wherein the response content is a rejection of the message.

4. The computer-implemented method of claim 3, wherein the rejection is provided because the request data is not cryptographically signed.

5. The computer-implemented method of claim 3, wherein the rejection is provided if the message type identifier does not correspond to a message type.

6. The computer-implemented method of claim 3, wherein the rejection is provided if a profile registered on the asset transfer processing platform cannot be determined.

7. The computer-implemented method of claim 1, wherein the permit data structure comprises data identifying at least one of:

an asset type associated with the profile;

an asset manager identifier;

permissions provided to the asset manager by the profile;

permissions provided to the user associated with the profile.

8. The computer-implemented method according to claim 1, wherein the message response protocol determines an event stream operation to be applied to the event stream.

9. The computer-implemented method according to claim 8, wherein the event stream operation is a write-operation.

10. The computer-implemented method according to claim 8, wherein the event stream operation is a read operation.

11. The computer-implemented method according to claim 1, wherein the identified message type corresponds to a request for a session key, the method further comprising:

determining a cryptographic signature used to sign the request data;

verifying the cryptographic signature using the permit data structure;

determining whether a session token can be issued based on a verification of the cryptographic signature;

generating a session token; and providing the session token to the client device.

12. The computer-implemented method according to claim 1, wherein the identified message type corresponds to an update request requesting an update to at least one account associated with an asset type, further wherein the message response protocol is an update request protocol, wherein applying the update request protocol comprises:

determining whether the update is a duplicate based on the data items extracted from the request data by determining the presence of corresponding instruction data on a log of events previously appended to the event stream;

further wherein, if the update is a duplicated update, generating a response message to be provided to the client device indicating the update is a duplicate; and further wherein, if the update is not a duplicate, applying an update processing protocol to the request data for determining a validity of the update; and, if the update is valid, appending the update to the event stream; and, if the update is not valid, generating a rejection message for the client device.

13. The computer-implemented method according to claim 12, wherein the generation of the update request comprises:

generating a blockchain transaction for synchronising event streams corresponding to entities identified in the request data wherein the blockchain transaction comprises, for each of the entities identified in the request data, a dust input spending a dust output associated with a previous transaction and a respective unspent transaction output corresponding to the dust input, and an unspent transaction output associated with the request; and updating event streams corresponding to the entities identified in the request data.

14. The computer-implemented method according to claim 1, wherein the identified message type corresponds to a settings request requesting a change to at least one field in the profile associated with the asset transfer processing platform and wherein the message response protocol is a settings request protocol, wherein applying the settings request protocol comprises:

extracting from the data items at least one identifier respectively identifying a profile setting to be modified by a modification;

determining from the permit data structure whether the user is permitted to make the modification; and based on the permit data structure, modifying the at least one setting.

15. The computer-implemented method according to claim 1, wherein the data items comprise a timestamp identifying a time at which the message was generated; and the processing resource admits the request if the timestamp indicates that the message was generated within a determined period of time from a current time; and rejects the request if the timestamp indicates the time at which the message was generated was outside of the determined period.

16. A computer-implemented method of enabling a user to update a balance associated with an asset transfer processing platform, the method implemented by a processing resource, the method comprising:

receiving a message from a client device associated with a user, the message comprising:

an identifier associated with a balance update;

at least one identifier associated with a profile registered on the asset transfer processing platform, wherein the profile is associated with at least one event stream provided by the asset transfer processing platform, wherein the at least one event stream is associated with at least one asset type; and request data related to the update of the balance;

determining, from the received message, the at least one profile identified in the message;

identifying a permit data structure, wherein the permit data structure provides a criterion defining which users can update the balance;

processing the request data to determine a presence of a cryptographic signature used to sign the request data and, based on the determination of the presence of a cryptographic signature used to sign the request data, further process the request data to extract data items from the request data to be used in the update of the balance;

applying an update request protocol to the extracted data items to determine whether the balance can be updated;

generating a response to the message based on the update request protocol, the extracted data items and the permit data structure by;

determining, using the permit data structure, whether the user has required cryptographic rights to update the balance;

determining, using the update request protocol, whether the update can be made; and based on a concurrence with the requirements of the determined message type, generating response content by updating the balance and interacting with the at least one event stream associated with the profile.

17. A computer-implemented method of enabling a user to use a computing device to access an asset transfer processing platform, the method implemented by a processing resource, the method comprising:

initialising an application on the computing device, the application configured to generate a message comprising:

at least one identifier of a message type associated with the message;

at least one identifier associated with a profile registered on the asset transfer processing platform, wherein the profile is associated with at least one event stream implemented by the asset transfer processing platform, wherein the at least one event stream is associated with at least one asset type; and request data related to a request associated with the message and the profile;

receiving input from the user identifying:

the message type for the message to be sent to the asset transfer processing platform;

a profile registered on the asset transfer processing platform;

request data comprising content of a request to be made to the asset transfer processing platform;

applying a cryptographic signature to the request data to generate signed request data;

generating a response to the message comprising:

an identifier of the message type identified by the user;

an identifier of the profile registered on the asset transfer processing platform; and the signed request data; and sending the response to the message to the asset transfer processing platform.

18. An asset transfer processing platform configured to:

receive a message from a client device associated with a user, the message comprising:

at least one identifier of a message type associated with the message;

at least one identifier associated with a profile registered on the asset transfer processing platform, wherein the profile is associated with at least one event stream implemented by the asset transfer processing platform, wherein the at least one event stream is associated with at least one asset type; and request data related to a request associated with the message and the profile;

determine, from the received message, the message type associated with the message and the profile registered on the asset transfer processing platform;

identify, based on the determined message type, a message response protocol for the determined message type;

identify a permit data structure for the profile, wherein the permit data structure provides a criterion defining which users can interact with the profile using the determined message type;

process the request data to determine a presence of a cryptographic signature used to sign the request data and, based on the determination of the presence of a cryptographic signature used to sign the request data, further process the request data to extract data items from the request data to be used in the determination of a response using the identified message response protocol; 5 apply the identified message response protocol to the extracted data items;

generate a response to the message based on the message response protocol, the extracted data items and the permit data structure by: 10 determining, using the permit data structure, whether the user has required cryptographic rights to interact with the profile using the identified message type;

determining, using the message response protocol, whether the extracted data items meet the requirements of the determined message type; and 15 based on the requirements of the determined message type, generating response content by interacting with the at least one event stream associated with the profile. 20

\*   \*   \*   \*   \*